US006333792B1

(12) United States Patent
Kimura

(10) Patent No.: US 6,333,792 B1
(45) Date of Patent: Dec. 25, 2001

(54) RESOLUTION CONVERSION MODULE, PRINTER DRIVER WITH RESOLUTION CONVERSION MODULE, AND IMAGE RESOLUTION CONVERSION METHOD

(75) Inventor: Takeo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,969

(22) Filed: Feb. 27, 1998

(30) Foreign Application Priority Data

Feb. 28, 1997 (JP) .................................................... 9-046636

(51) Int. Cl.[7] ............................ B41B 15/00; B41J 15/00; H04N 1/387; H04W 1/393; G06K 9/40
(52) U.S. Cl. ............................ 358/1.2; 358/1.1; 358/401; 358/450; 358/451; 382/268; 382/269
(58) Field of Search .................................... 382/268, 269, 382/237, 258, 299; 358/401, 458, 451, 1.1, 447, 1.2, 450

(56) References Cited

U.S. PATENT DOCUMENTS 5,528,704 * 6/1996 Parker et al. ........................ 382/299
5,704,019 * 12/1997 Akiyama et al. ..................... 358/1.1

FOREIGN PATENT DOCUMENTS 7-105359    4/1995   (JP) .

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

An image resolution conversion method which can cope with arbitrary magnifications including non-integer magnifications with simple operation and sequence, has an identical interface, and can be efficiently installed in a printer driver, and a resolution conversion module that implements the method. The resolution conversion module receives information representing the resolutions before and after conversion from an image processing program, and calculates the magnification or reduction value for each pixel of an original image before conversion on the basis of the received information. The module receives information of a processing region, which is segmented with reference to the image size after conversion, from the image processing program, and obtains that region on the original image before conversion, which corresponds to the segmented processing region, on the basis of the magnification or reduction values for pixels. The module passes the information of the obtained region of the original image to the image processing program, and requests the image processing program to transfer original image data. The module changes the size of the original image data of the obtained region on the original image received from the image processing program on the basis of the magnification or reduction values for pixels for each region, and passes the data after resolution conversion of the region to the image processing program.

20 Claims, 21 Drawing Sheets

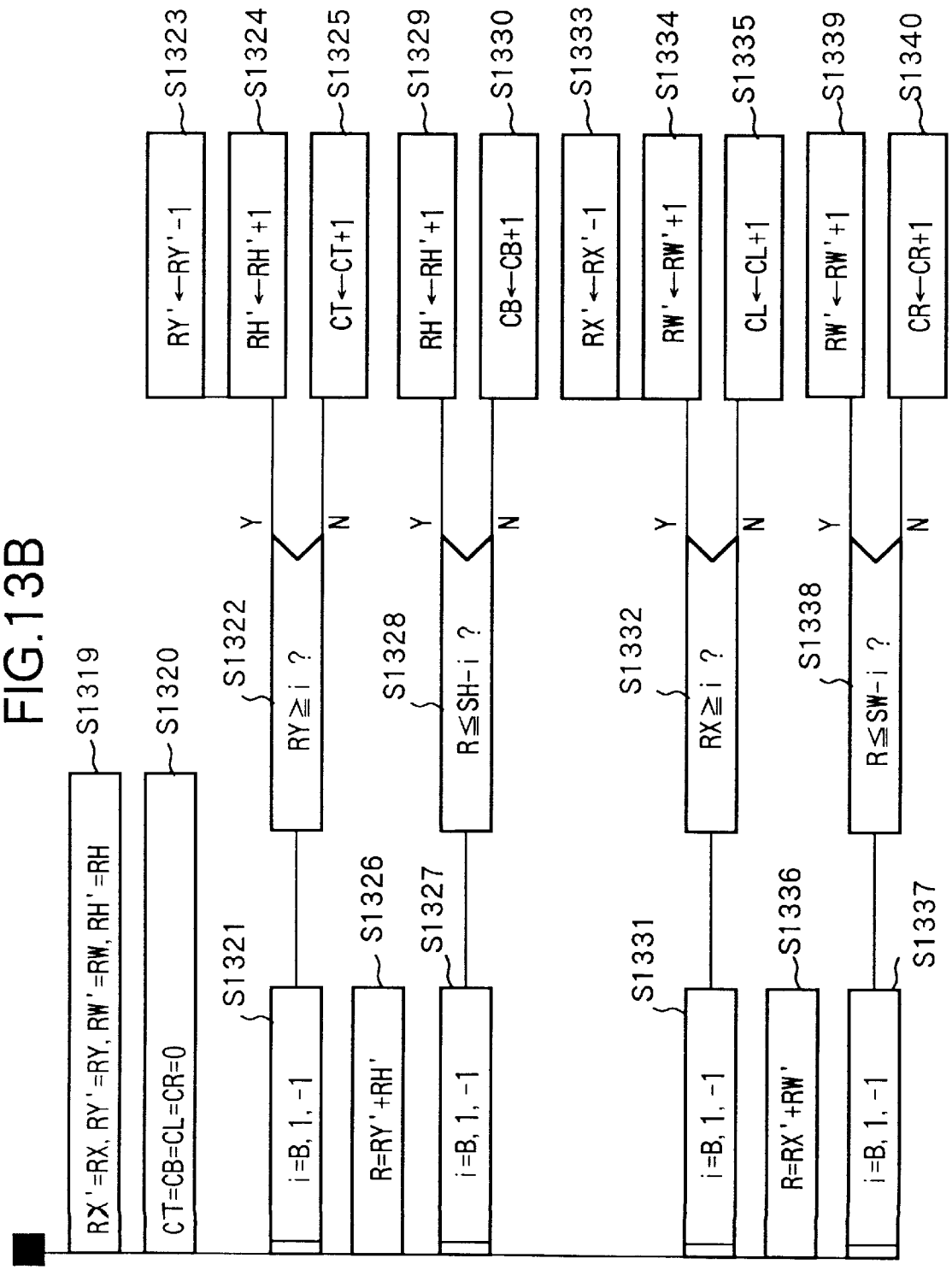

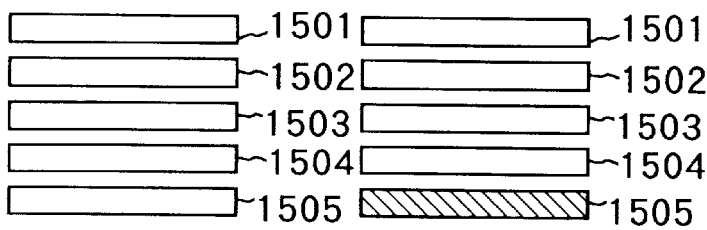
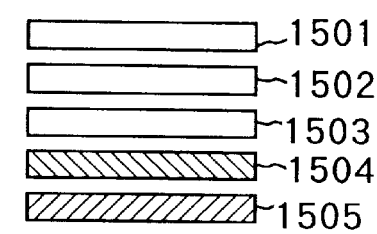
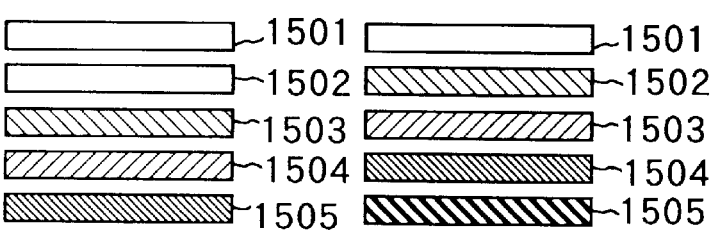
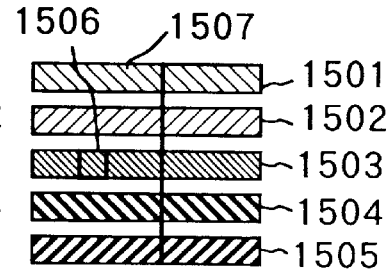
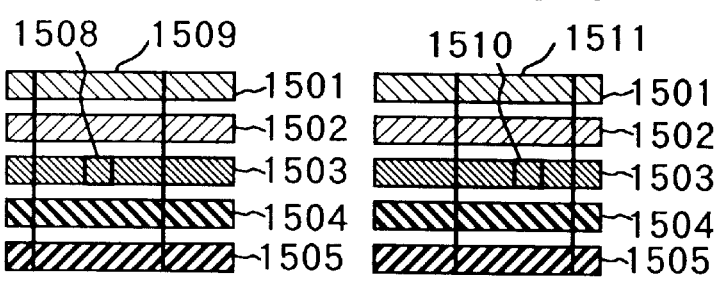
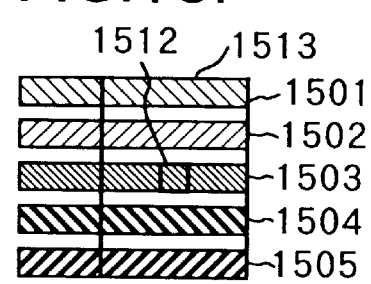
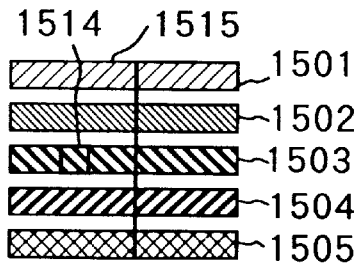

RESOLUTION CONVERSION MODULE, PRINTER DRIVER WITH RESOLUTION CONVERSION MODULE, AND IMAGE RESOLUTION CONVERSION METHOD

BACKGROUND OF THE INVENTION

The present invention relates to an image resolution conversion method for converting the resolution of an image by increasing or decreasing the number of pixels that express the image. More particularly, the present invention relates to a resolution conversion module that can be built in a printer driver in a host computer and implements the image resolution conversion method, and a printer driver with that module, and has as its object to change the resolution of image data on a computer in correspondence with the resolution of an output apparatus such as an ink-jet printer or the like. Furthermore, the present invention relates to various storage media that store an image processing program including the resolution conversion module.

In general, in computer systems, since the resolutions used are different between the input and output apparatuses, the input/output apparatus and computer main body, or the systems in correspondence with their purposes, images are often processed at different resolutions. Of such differences, the resolution difference between the computer main body or display, and printer is most frequently.

A program called a printer driver runs on a computer, and generates data to be printed by a printer and outputs a drawing command to the printer. The printer driver converts commands that are standardized among the respective OS's and are used for drawing characters, figures, and images into drawing commands that can be interpreted by each printer. In this case, the printer driver must take the difference between the processing resolution on the application program and the resolution at the printer into consideration. For example, when the application program manages data at 90 dpi, and that data is output by a printer having a resolution of 360 dpi, the printer driver must generate page data having pixels four times those of the original data in both the vertical and horizontal directions.

Serial printers represented by ink-jet printers, to which the present invention is especially suitably applied, have no PDL (page description language), and normally print upon receiving print commands based on bitmap data generated by printer drivers. Hence, such printer driver converts character and figure data expressed by vectors into bitmap data with an output resolution by directly mapping them on a memory to have the number of pixels corresponding to printer resolutions. As for image data which is already bitmap data, the printer driver converts them into bitmap data with an output resolution by changing their size by enlargement or reduction in correspondence with the output resolution.

There are various types of resolution conversion methods achieved by enlargement or reduction of bitmap data. For example, when enlargement is used, 0-th order interpolation that simply repeats pixels in correspondence with an enlargement factor, linear interpolation that fills pixels produced by enlargement on the basis of, e.g., the ratio of distances from the original pixel, a method of attaining optimal enlargement by switching various interpolation schemes depending on the layout state of surrounding pixels (Japanese Laid-Open Patent No. 7-105359), and the like are available.

However, the image processing in a printer driver has many limitations, and it is often impossible or difficult to install resolution conversion in the driver, since the individual schemes cannot directly cope with arbitrary magnifications including non-integer magnifications, since these schemes cannot cope with processing in units of arbitrary numbers of lines that may produce a discontinuity between neighboring bands in the output result, and so on. Such problems are serious in digital image filter-based image processing schemes that require surrounding pixels upon processing each pixel. However, in general, the digital image filter-based processing can assure higher image quality after processing than simple processing such as 0th-order interpolation that does not use any surrounding pixels.

SUMMARY OF THE INVENTION

It is an object of the present invention to provide an image resolution conversion method that can cope with arbitrary magnifications including non-integer magnifications with simple operation and sequence, and an image resolution conversion module that can implement the method.

It is another object of the present invention to provide an image resolution conversion method which can be efficiently installed in a printer driver using a standardized interface even if it has, especially, a digital filter-based enlargement/reduction method implemented as software on a computer, and an image resolution conversion module that implements the method.

It is still another object of the present invention to provide a printer driver installed with the image resolution conversion module.

It is yet another object of the present invention to provide a storage medium that stores a printer driver including the image resolution conversion module, an installation program, and an image processing program.

In order to achieve the above objects, according to the present invention, a resolution conversion module of the present invention is a resolution conversion module for converting a resolution of image data, comprising the steps of: receiving information representing resolutions before and after conversion from an external device; calculating a magnification or reduction value for each pixel of an original image before conversion on the basis of the received information; receiving information of a processing region, which is segmented with reference to an image size after conversion, from the external device; obtaining a region on the original image before conversion corresponding to the segmented processing region on the basis of the magnification or reduction values for pixels; passing information of the obtained region on the original image before conversion to the external device; receiving original image data of the obtained region from the external device; changing a size of the received original image data on the basis of the magnification or reduction values for pixels; and passing the data of the region after resolution conversion to the external device. Note that the information representing the resolutions before and after conversion represents sizes of image data before and after conversion, which are expressed by the numbers of pixels.

The resolution conversion module is installed in an image processing program. The image processing program is a printer driver, the resolution after conversion is a resolution of a printer, and the processing region which is segmented with reference to the image size after conversion is a band region. The magnification or reduction value for each pixel of the original image before conversion include a combination of an integer multiple or a fraction of an integer so that a sum of magnification or reduction values for a plurality of pixels yield magnification of the resolution before and after conversion. The information of the segmented processing region includes a start point position and size of the region. The step of obtaining the region on the original image includes the steps of: adjusting the start point and size using the number of pixels required for resolution conversion; and adjusting the start point and size of the region in consideration of end portions of the original image. The information of the obtained region on the original image includes a start point position and size of the region. The step of changing the size of the image includes the steps of: receiving image data in units of lines; holding the received image data in correspondence with the number of lines required for changing the size; discarding image data for the line which has become unnecessary and updating the image data to image data for a new line; and outputting processed data in units of lines.

A printer driver according to the present invention is a printer driver installed with a resolution conversion module for image data, the resolution conversion module comprising the steps of: receiving information representing resolutions before and after conversion from the driver; calculating a magnification or reduction value for each pixel of an original image before conversion on the basis of the received information; receiving information of a processing region, which is segmented with reference to an image size after conversion, from the driver; obtaining a region of the original image before conversion corresponding to the segmented processing region on the basis of the magnification or reduction values for pixels; passing information of the obtained region of the original image to the driver, requesting the driver to transfer original image data, and receiving the original image data of the obtained region therefrom; changing a size of an image on the basis of the magnification or reduction values for pixels for each obtained region of the original image; and requesting the driver to take size-changed data, and passing the data of the region after resolution conversion. Note that the information representing the resolutions before and after conversion represents sizes of image data before and after conversion, which are expressed by number of pixels.

An image resolution conversion method of the present invention is an image resolution conversion method for converting a resolution of image data, wherein when there are a resolution conversion module for performing resolution conversion and an image processing program that requires resolution conversion of image data, information representing resolutions before and after conversion and information of a processing region segmented with reference to an image size after conversion are passed from the image processing program to the resolution conversion module, the resolution conversion module calculates a magnification or reduction value for each pixel of an original image before conversion on the basis of the information representing the resolutions before and after conversion, obtains a region of the original image before conversion corresponding to the segmented processing region on the basis of the magnification or reduction values for pixels, passes the information of the obtained region to the image processing program, and requests the image processing program to transfer original image data of the region of the original image, and when the original image data of the region is passed from the image processing program to the resolution conversion program, the resolution conversion program changes a size of an image on the basis of the magnification or reduction values for pixels for each obtained region of the original image, and sends back size-changed image data to the image processing program. Note that the information representing the resolutions before and after conversion represents sizes of image data before and after conversion, which are expressed by the numbers of pixels. When the region of the original image is obtained, a start point and size are adjusted using the number of pixels required for resolution conversion, and a start point and size of the region are adjusted in consideration of end portions of the original image.

An image resolution conversion method of the present invention is an image resolution conversion method for converting a resolution of image data, comprising the steps of: calculating a magnification or reduction value for each pixel of an original image before conversion on the basis of information representing resolutions before and after conversion; obtaining a region of the original image before conversion corresponding to a processing region, which is segmented with reference to an image size after conversion, on the basis of the magnification or reduction values for pixels; and changing a size of an image on the basis of the magnification or reduction values for pixels in units of original image data of the regions on the original image. Note that the information representing the resolutions before and after conversion represents sizes of image data before and after conversion, which are expressed by the numbers of pixels. The magnification or reduction value for each pixel of the original image before conversion include a combination of an integer multiple or a fraction of an integer so that a sum of magnification or reduction values for a plurality of pixels yield magnifications of the resolutions before and after conversion. When the region on the original image is obtained, a start point and size are adjusted using the number of pixels required for resolution conversion, and a start point and size of the region are adjusted in consideration of end portions of the original image.

An image processing apparatus of the present invention is an image processing apparatus for performing image processing including resolution conversion of image data, the apparatus attaining the resolution conversion by: magnification generation means for calculating a magnification or reduction value for each pixel of an original image before conversion on the basis of information representing resolutions before and after conversion; corresponding region calculation means for calculating a region on the original image before conversion corresponding to a processing region, which is segmented with reference to an image size after conversion, on the basis of the magnification or reduction values for pixels; and size change means for changing a size of an image on the basis of the magnification or reduction values for pixels in units of original image data of the regions on the original image. Note that the information representing the resolutions before and after conversion represents sizes of image data before and after conversion, which are expressed by the numbers of pixels. The magnification or reduction value for each pixel of the original image before conversion include a combination of an integer multiple or a fraction of an integer so that a sum of magnification or reduction values for a plurality of pixels yield magnification of the resolution before and after conversion. When the region on the original image is obtained, a start point and size are adjusted using the number of pixels required for resolution conversion, and a start point and size of the region are adjusted in consideration of end portions of the original image. The resolution after conversion is a resolution of a printer, and the processing region which is segmented with reference to the image size after conversion is a band region.

As described above, according to the present invention, an image resolution conversion method that can cope with arbitrary magnifications including non-integer magnifications with simple operation and sequence, and an image resolution conversion module that can implement the method can be provided.

An image resolution conversion method which can be efficiently installed in a printer driver using a standardized interface even if it has, especially, a digital filter-based enlargement/reduction method implemented as software on a computer, and an image resolution conversion module that implements the method can be provided.

Furthermore, a printer driver with the image resolution conversion module can be provided.

For example, since every resolution conversion methods can be installed in a printer driver using a standardized interface, even if the individual processing methods have problems: arbitrary magnifications including non-integer magnifications cannot be used, discontinuity is formed between adjacent bands in the output result, processing in units of an arbitrary number of lines cannot be done, and so on, such problems can be solved, and these methods can be used in the printer driver.

Since all the processing methods can be used with an arbitrary rectangular region as a processing unit, a processing unit called a band can be further segmented into smaller ones depending on the available memory capacity. For the same reason as above, changes in band segmentation direction due to changes in print direction (portrait or landscape) can be flexibly coped with. Furthermore, since the calling method, by the driver, can be standardized irrespective of the processing methods used, the processing on the driver side can be simplified, the program size of the driver itself can be reduced, the driver itself hardly suffers code errors, and so on.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13B is a flow chart showing an example of the corresponding region formation sequence;

FIGS. 15A to 15J are views for explaining the use states of buffers;

DETAILED DESCRIPTION OF THE PREFERRED EMBODIMENTS

The preferred embodiments of the present invention will be described in detail hereinafter with reference to the accompanying drawings.
(First Embodiment)

The first embodiment will be explained below with reference to FIGS. 1 to 15.
<Example of System Arrangement Which Implements Image Resolution Conversion Method of This Embodiment>

Figure 1:
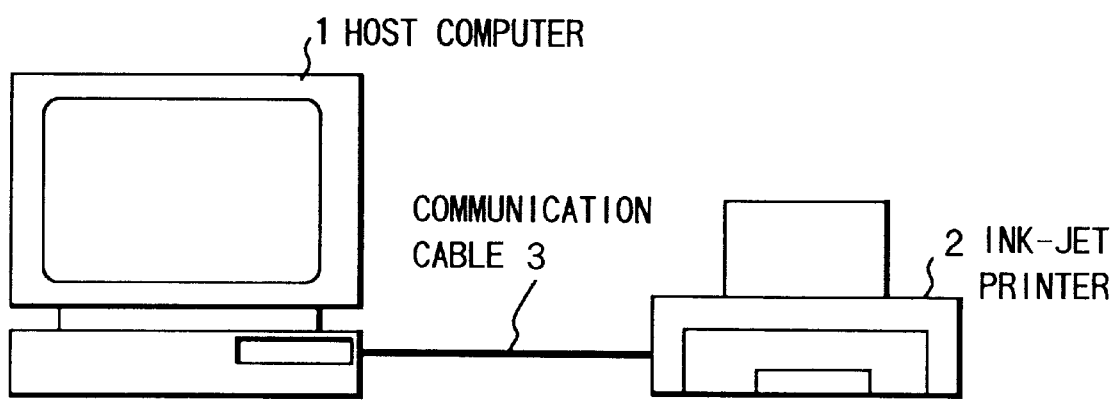
FIG. 1 is a schematic view showing an example of a system according to an embodiment of the present invention.

FIG. 1 shows a system according to the embodiment of the present invention. In this embodiment, the image resolution conversion method of the present invention is installed in a printer driver. However, the present invention is not limited to such a specific configuration. That is, the same effects as in this embodiment can be obtained even when the image resolution conversion method of the present invention may be installed in other drivers or may be used as a stand-alone resolution conversion module.

In FIG. 1, reference numeral 1 denotes a host computer on which a printer driver comprising the image resolution conversion method of this embodiment runs, and which comprises a CPU, RAM, ROM, external storage device, printer port, and the like. In the host computer 1, the CPU performs arithmetic operations and control in accordance with a program stored in the ROM or a program loaded from the external storage device onto the RAM, so as to generate drawing commands and bitmap data, convert the resolution, and generate and output print commands. Reference numeral 2 denotes a binary color printer such as an ink-jet printer which is controlled by the printer driver. The host computer 1 and printer 2 are connected via a communication cable 3. The host computer 1 sends print data based on bitmap data to the printer 2 to print.

Figure 2:
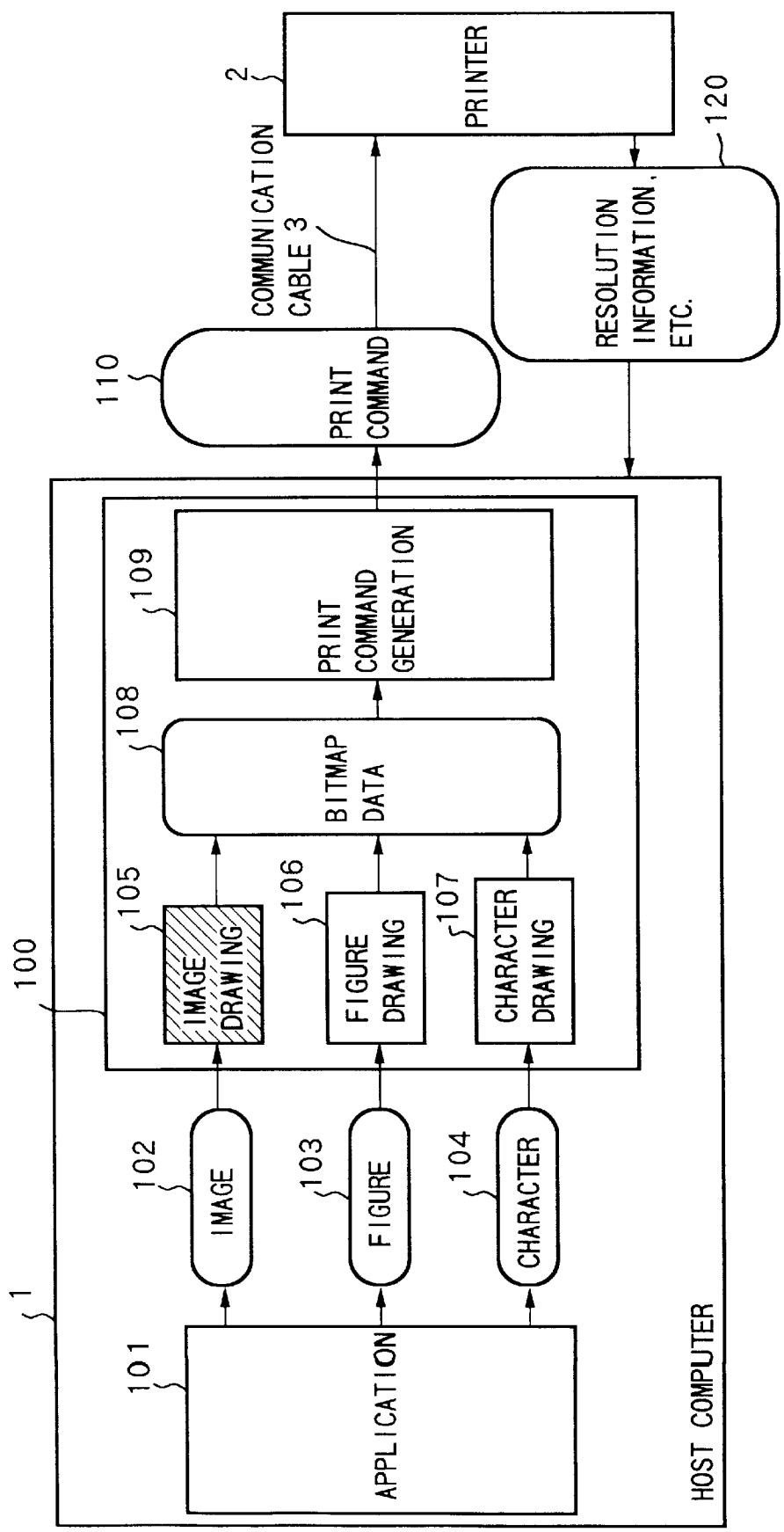
FIG. 2 is a block diagram showing a block diagram arrangement of a print processor including the embodiment.

FIG. 2 is a flow of data when printing is done using a printer driver 100 with the resolution conversion method according to the embodiment of the present invention.

Upon receiving drawing commands of an image 102, FIG. 103, and character 104 from an application program, the printer driver 100 generates bitmap data 108 on a band buffer at the resolution of the printer 2 using drawing routines 105 to 107 corresponding to the commands. The generated bitmap data 108 is converted by a print command generator 109 into data (print command 110) in the format that the printer 2 can print, and the converted data is sent to and printed by the printer 2 via the communication cable 3. Note that information such as the resolution of the printer 2 or the like may be input by the operator, but is preferably sent from the printer 2 to the host computer 1 via the communication cable 3 (resolution information 120 or the like).

Figure 3:
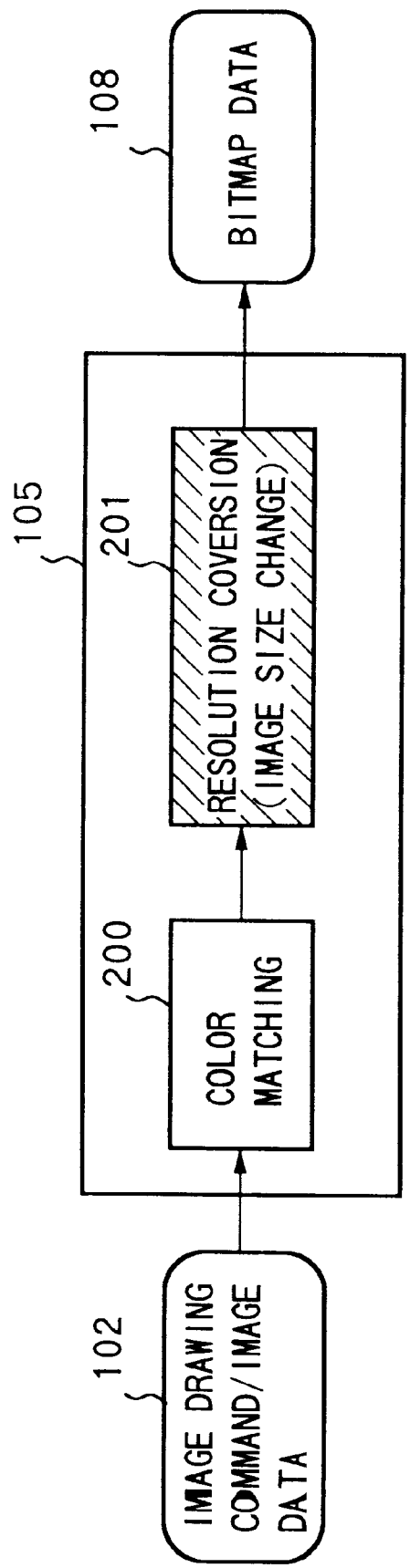
FIG. 3 is a block diagram showing a drawing processing unit associated with image data.

FIG. 3 is a block diagram of the image drawing unit (routine) 105 shown in FIG. 2.

Upon receiving the image drawing command 102 from an application program 101, the image drawing unit 105 changes the colors of pixels in image data using a color matching unit 200 to minimize the color differences between the image observed on the monitor of the host computer 1 and the print output from the printer 2. Then, the image drawing unit 105 changes the size of the color-matched data in correspondence with the resolution of the printer 2 using a resolution converter 201, thus adjusting the number of pixels.

For example, if image data based on an image drawing command 102 passed from the application program 101 is a square image consisting of 100 pixels in both the vertical and horizontal directions, and having a resolution of 90 dpi, the size of that image data must be changed to obtain a square image consisting of 400 pixels in both the vertical and horizontal directions, so as to output an image having the same area from the printer 2 having a resolution of 360 dpi. More specifically, the image data passed from the application program 101 is processed by the resolution converter 201 so that each pixel is converted into 16 (=4×4) pixels.

In this case, various methods of changing (enlarging) the size of an image are available. According to this embodiment, the interfaces of the resolution conversion methods can be standardized.

<Example of Sequence of Image Resolution Conversion Method of First Embodiment>

Figure 4:
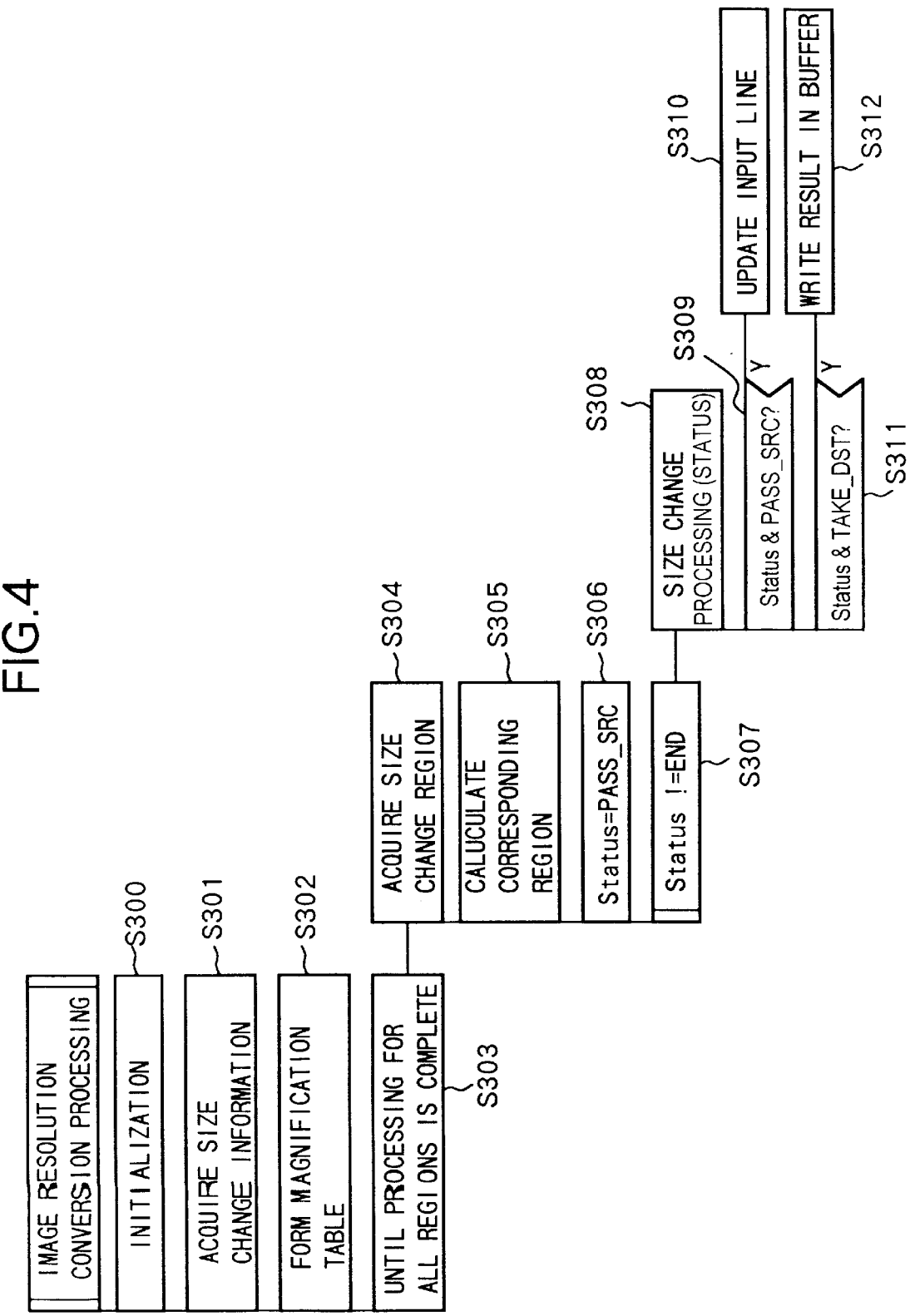
FIG. 4 is a flow chart showing an example of the image resolution conversion sequence.

FIG. 4 is a flow chart showing the processing of the image resolution conversion method according to the embodiment of the present invention.

In step S300, initialization is performed. For example, a work memory required for the processing is assigned. In step S301, size change information for resolution conversion is acquired. More specifically, the following information is obtained: the numbers of vertical and horizontal pixels (SH and SW) of an original image, the bit length of each pixel, the storage format of each pixel, the numbers of vertical and horizontal pixels (DH and DW) after resolution conversion, and the like. On the basis of the information of the numbers of vertical and horizontal pixels before and after resolution conversion of such information, a table for holding the magnification values (including enlargement and reduction factors) for pixels is formed in step S302.

When the resolution conversion module is installed in the printer driver like in this embodiment, the size change information is acquired from the printer driver in step S301. The printer driver may acquire the size change information either by user's designation via a user interface or from the printer automatically via information transmission. When the resolution conversion module is solely used, the size change information may be directly designated by the user via the user interface.

Figure 5:
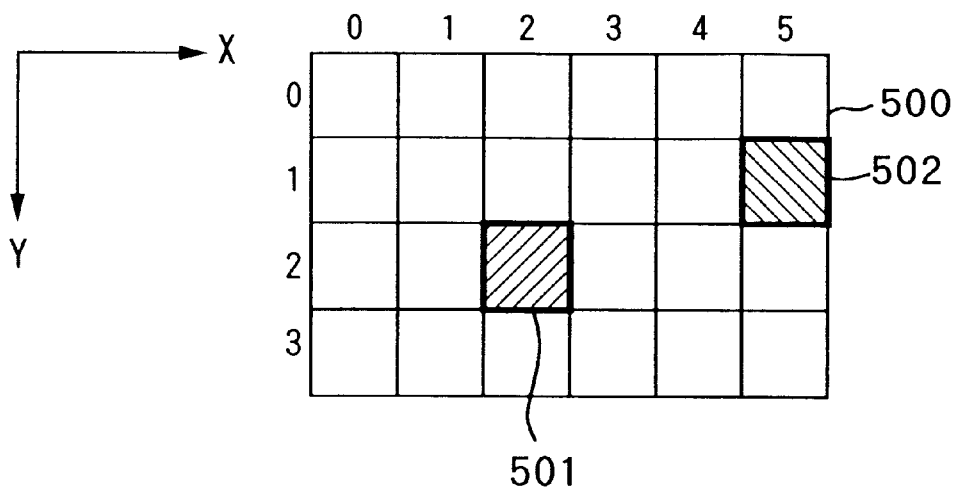
FIG. 5 shows an example of an original image.
Figure 6:
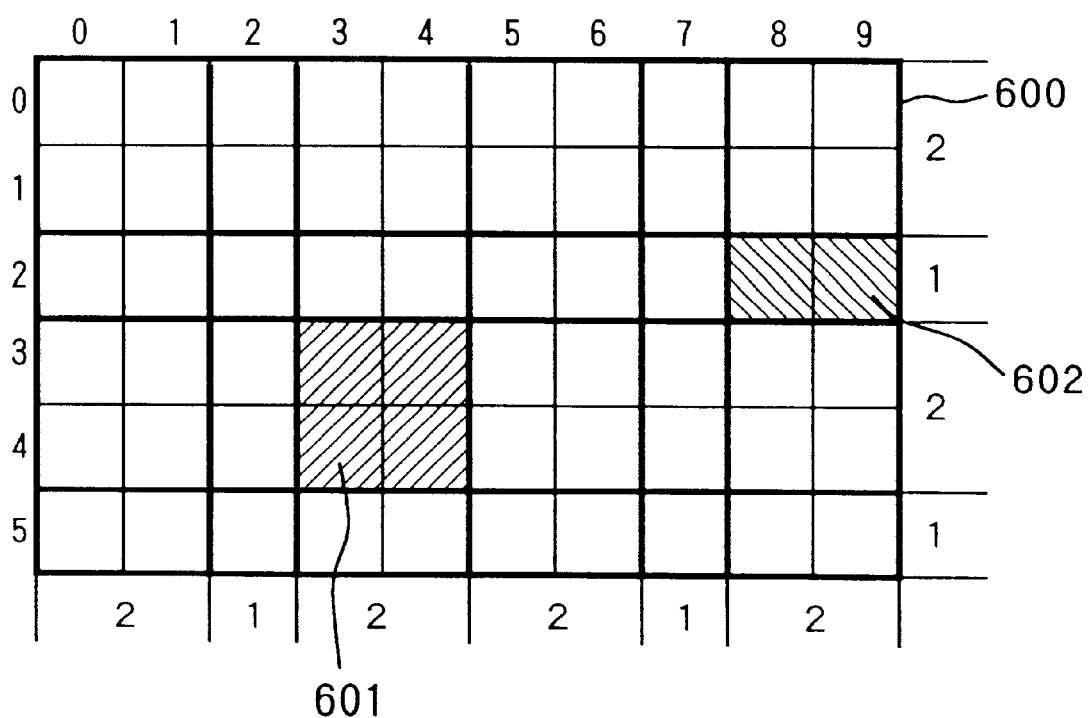
FIG. 6 shows an example of an image after conversion upon enlargement.

As an example of resolution conversion, a case will be described below wherein an image 500 (4 vertical pixels, 6 horizontal pixels) shown in FIG. 5 is converted into an image 600 (6 vertical pixels, 10 horizontal pixels) with the size shown in FIG. 6. In this example, the image 500 is enlarged to 6/4 and 10/6 in the vertical and horizontal directions.

(Example of Magnification Table and Example of its Formation Sequence)

Figure 7:
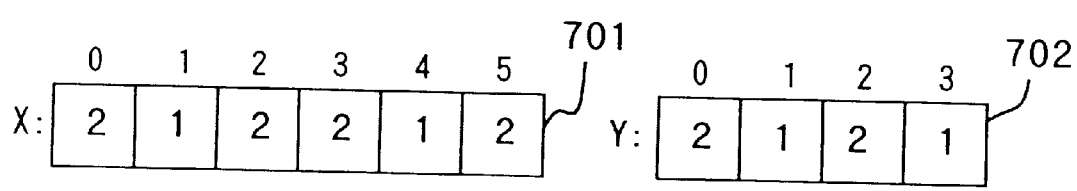
FIG. 7 shows an example of magnification tables upon enlargement.

FIG. 7 shows the contents of the magnification table in this example. The values in the respective columns of the image 500 are respectively multiplied by 2, 1, 2, 2, 1, and 2 according to an X-magnification table 701, and those in the respective rows are respectively multiplied by 2, 1, 2, and 1 according to a Y-magnification table 702. According to these tables, a pixel 501 in the image 500 is used as a source (original pixel) for generating a region 601 (2 vertical pixels, 2 vertical pixels) in the image 600, and a pixel 502 is used as a source for generating a region 602 (1 vertical pixel, 2 horizontal pixels). In this way, by preparing the X- and Y-magnification tables, resolution conversion of an image can be done at an arbitrary magnification including a non-integer magnification independently in the vertical and horizontal directions.

Figure 8:
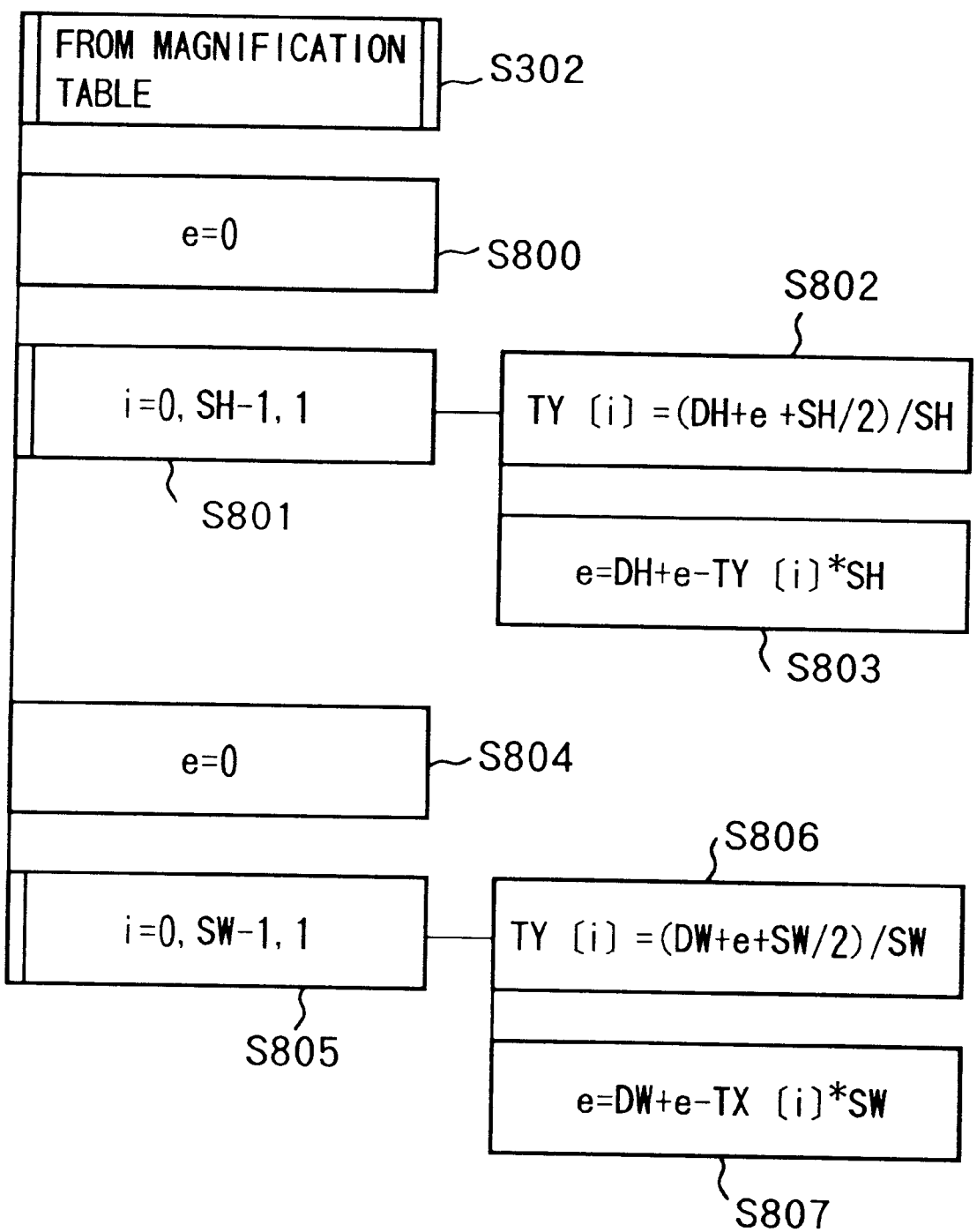
FIG. 8 is a flow chart showing an example of the magnification table formation sequence upon enlargement.

FIG. 8 is a flow chart showing the sequence of the formation method of the magnification tables 701 and 702.

In FIG. 8, SH and SW are the numbers of vertical and horizontal pixels (SH=4, SW=6 in the example) of an image before resolution conversion, and DH and DW are the numbers of vertical and horizontal pixels (DH=6, DW=10 in the example) after resolution conversion. TY[i] indicates the i-th element in the Y-magnification table 702, and TX[i] indicates the i-th element in the X-magnification table 701. Note that the division is an integer operation, and the quotient is rounded off (e.g., 10/6→1). Note that "variable =a, b, c (e.g., i=0, SH−1, 1)" in step S801 or S805 means repetition of its downstream steps while incrementing the variable from a to b in units of c (or decrementing the variable if c is a negative value). The same applies to the following description.

The flow of the processing will be explained below. In step S800, a variable e that represents a calculation error is reset to 0. In step S801, steps S802 and S803 are repeated from 0 to SH−1 while incrementing a variable i in unitary increments. In step S802, the value of each element in the Y-magnification table is calculated in consideration of the accumulated calculation error. In step S803, the calculation error is updated. As a result, the Y-magnification table 702 is formed to have TY[i] (i=0 to 3).

Similarly, the variable e that represents a calculation error is reset to 0 again in step S804. In step S805, steps S806 and S807 are repeated from 0 to SW−1 while incrementing the variable i in unitary increments. In step S806, the value of each element in the X-magnification table is calculated in consideration of the accumulated calculation error. In step S807, the calculation error is updated. As a result, the X-magnification table 701 is formed to have TX[i] (i=0 to 5).

The magnification tables are formed by the above-mentioned method. The elements of the magnification tables are integers, as shown in FIG. 7. This embodiment using the magnification tables can attain pseudo resolution conversion at an arbitrary magnification by combinations of integer multiples. This means that even a resolution conversion method that can only change image size at integer magnifications can change image size at non-integer magnifications if the method of this embodiment is used. According to the method of this embodiment, the totals of the element values of the magnification tables equal the numbers of vertical and horizontal pixels after processing in case of enlargement. In this embodiment, the total of elements in the X-magnification table 701 is 10 (=2+1+2+2+1+2), which agrees with the number 10 of horizontal pixels of the image 600 after enlargement. Also, the total of elements in the Y-magnification table 702 is 6 (=2+1+2+1), which agrees with the number 6 of vertical pixels of the image 600 after enlargement.

(Example of Resolution Conversion)

After the magnification tables are formed in step S302, steps S304 to S312 are repetitively applied to each region while checking in step S303 if processing for all the regions to be processed is complete. The definition of a region will be explained below.

(Example of Region Segmentation and Example of Use of Surrounding Pixels)

In step S304, an image is segmented into processing regions by determining the region to be resolution-converted. The printer driver to which the method of this embodiment is applied often has a limited memory capacity that can be used, and such region segmentation is required. Especially, in a driver for a serial printer represented by an ink-jet printer, it is a common practice to execute image processing and command generation in units of so-called bands (each obtained by segmenting the region to be processed into strip-shaped patterns). In this embodiment, processing can be done in units of arbitrary rectangular regions in higher degree of freedom. Note that region segmentation is done by designating segmented regions after resolution conversion in consideration of the circumstances involved, i.e., the use of a printer driver. That is, the segmented regions are determined depending on portions where data are to be generated for printing. At present, segmentation is normally done in units of bands, as described above, but the present invention is not limited to such specific method.

Figure 9:
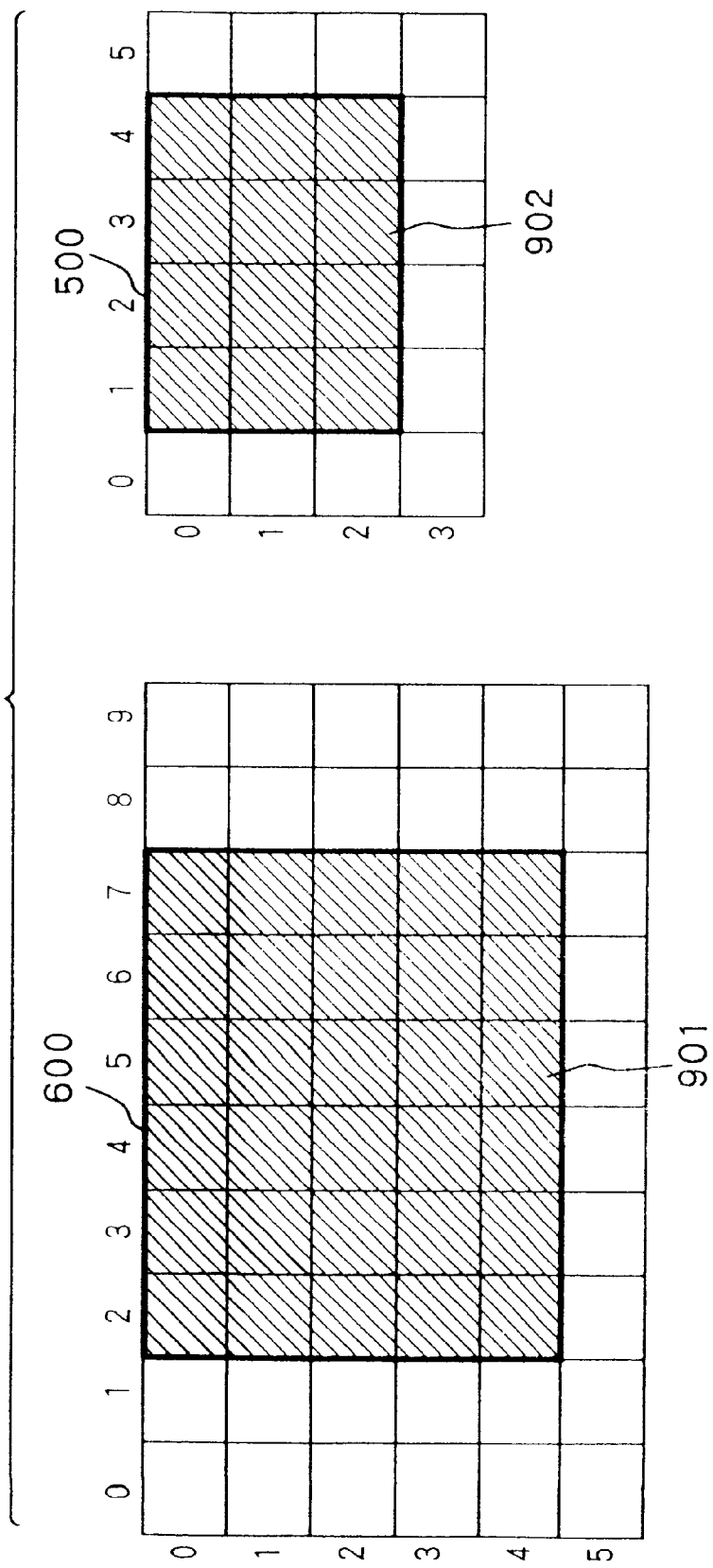
FIG. 9 shows the corresponding regions before and after conversion.

FIG. 9 shows the relationship between a region 901 extracted from a region occupied by the image 600 after enlargement, and a region 902 in the original image 500 required for processing this region.

The region 902 is determined using the magnification tables 701 and 702 above. The magnification tables 701 and 702 store enlargement factors for the individual pixels of the original image 500. Using these tables, which pixels in the original image 500 are enlarged to obtain those of the enlarged image 600 can be detected at the same time. Hence, in order to obtain the region 902 before enlargement from the region 901 after enlargement, a set of pixels as an enlargement source of each pixel included in the region 901 need only be obtained. However, as can be seen from the relationship between the pixel 501 and the region 601, each pixel after enlargement is only a portion of a region obtained by enlarging the original pixel, but if it belongs to the region 901, the pixel as the enlargement source must be included in the region 902.

Figure 10:
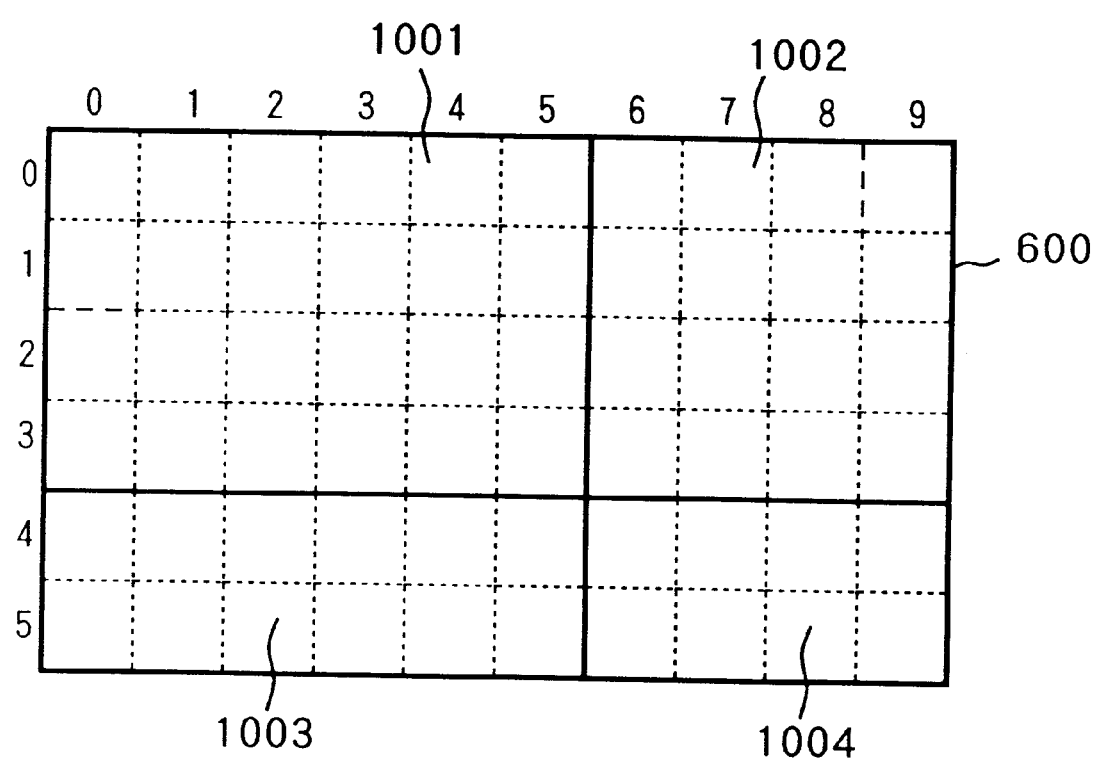
FIG. 10 shows an example of region segmentation.

FIG. 10 shows an example of segmentation when the image 600 is segmented into four regions 1001, 1002, 1003, and 1004 to execute processing.

Figure 11:
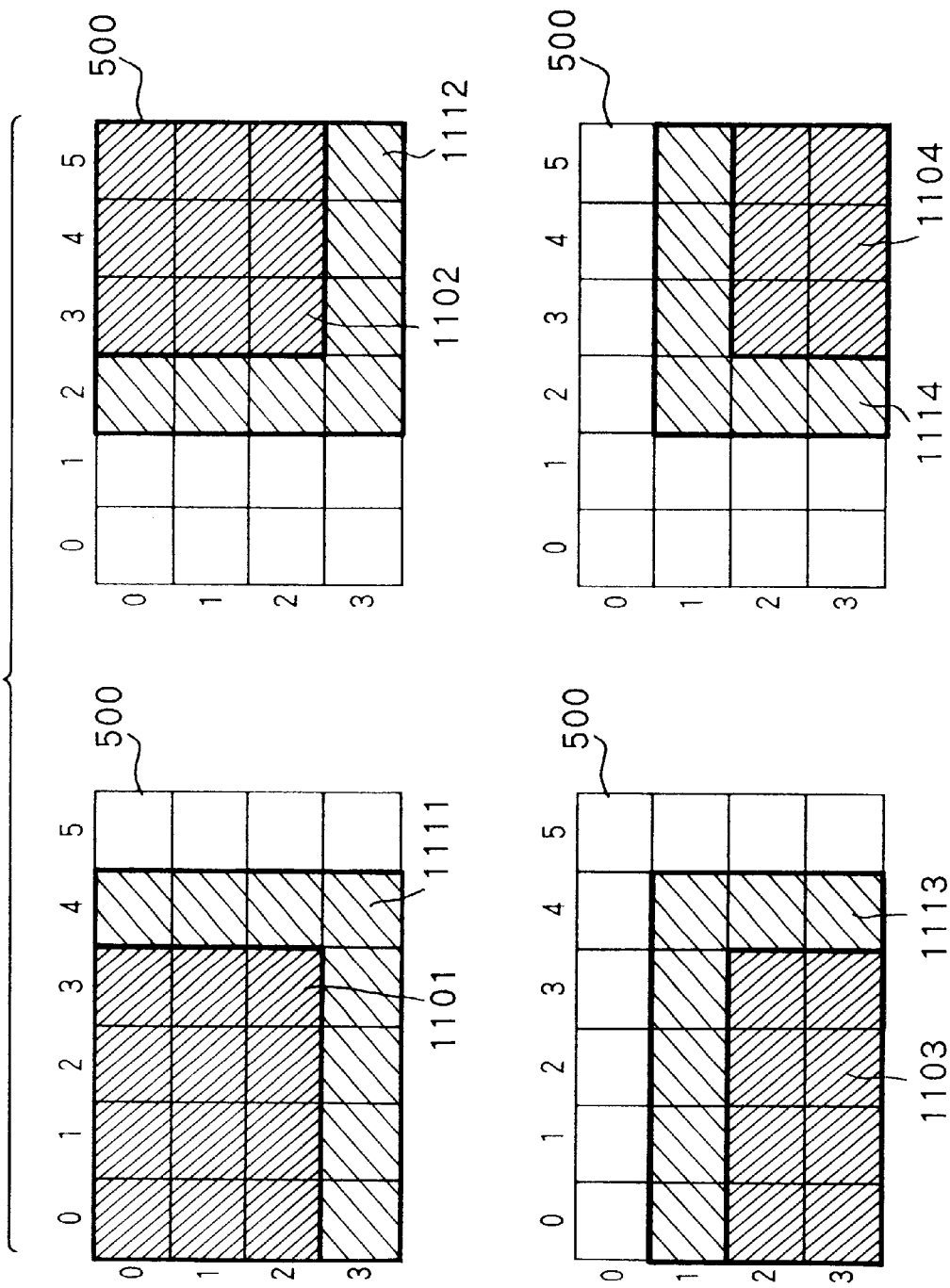
FIG. 11 shows regions on a region-segmented original image.

At this time, the regions of the original image corresponding to these regions are regions 1101, 1102, 1103, and 1104 shown in FIG. 11. For the reason mentioned above, when the image is segmented across regions after enlargement of a certain original pixel (FIG. 10), the four regions 1101, 1102, 1103, and 1104 in the original image partially overlap each other. For example, in the regions 1101 and 1102, three pixels (3, 0), (3, 1), and (3, 2) are present in both the regions.

Most of resolution conversion methods of an image require pixels around the object pixel as a conversion source for forming a certain pixel after conversion. For example, linear interpolation forms a new pixel by calculating the ratio between neighboring pixels before enlargement depending on the position of a pixel after enlargement. Also, resolution conversion in Japanese Laid-Open Patent No. 7-105359 above requires surrounding pixels in processing. However, the number of surrounding pixels required varies depending on the methods and the required processing precision. In this embodiment, the resolution conversion module takes into account this information upon determining an original region corresponding to the converted region, so the driver need not change the method of passing data.

For example, the region 1101 determined based on the magnification tables 701 and 702 is an original region corresponding to the region 1001. If the enlargement method called from the driver requires one surrounding pixel of each original pixel, the module informs the driver of a region as the sum of the region 1101 and a region 1111, so that the driver can pass all the required data. Similarly, the regions 1002, 1003, and 1004 correspond to regions 1102+1112, 1103+1113, and 1104+1114. In this case, if the newly required regions (1111, 1112, 1113, and 1114) can be obtained from the original image, even when processing is done in units of regions, a continuous image can be obtained as the processing result as if it were processed without region segmentation. This is because the same processing can be done for the respective pixels although some pixels are repetitively processed since the surrounding portions of the individual regions overlap other regions.

Figure 12:
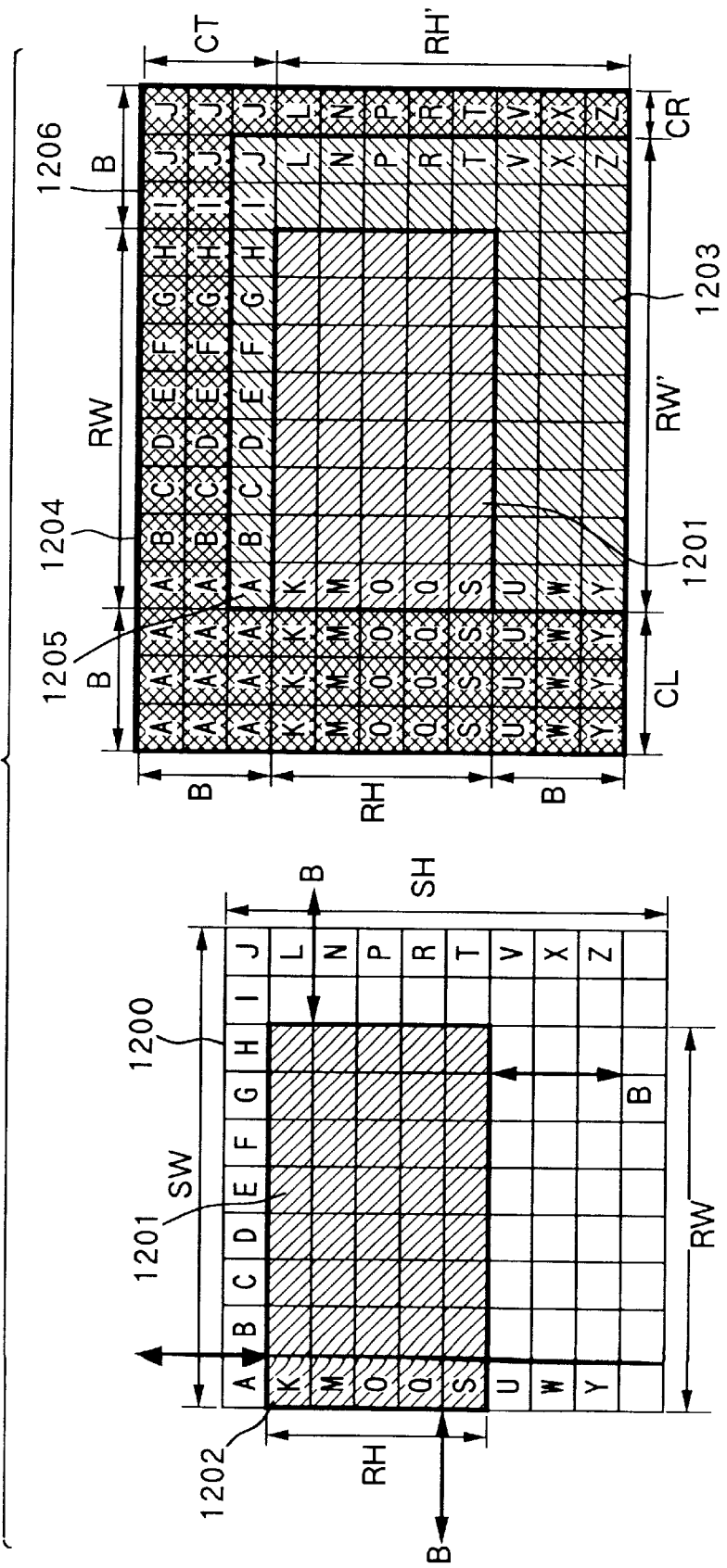
FIG. 12 is a view for explaining adjustment of an original region.

FIG. 12 shows an example in which the processing of a surrounding portion (edge portion processing) of an image is added upon region segmentation of the image.

In FIG. 12, reference numeral 1200 denotes an original image, and an original region 1201 which does not include any surrounding pixels is determined from the designated region on the basis of the magnification tables 701 and 702. At this time, assume that the size of the original image 1200 is SH vertical pixels×SW horizontal pixels, the size of the region 1201 is RH vertical pixels×RW horizontal pixels, and an upper left pixel 1202 in the region 1201 is located at a pixel position (RX, RY) of the image 1200 (SH=10, SW=10, RH=5, RW=8, RX=0, and RY=1 in the example shown in FIG. 12). If B pixels (B=3 in the example in FIG. 12) around the original pixel are required as information for enlargement, some of the B pixels are located at positions which are not present in the original image 1200. Note that B=0 in the 0-dimensional interpolation method and B=1 in the linear interpolation method suing one pixel surrounding an interested area. In this case, according to this embodiment, pixels obtained from the original image 1200 are used as much as possible, and pixels which cannot be obtained from the original image are obtained by copying the closest pixel values to form an imaginary image 1206. Using this image 1206 in resolution conversion, the image processing sequence can be simplified, and deterioration of image quality around the image can be prevented.

In FIG. 12, a region 1203 is adjusted using the original image, and a region 1204 is formed by copying pixels around the region 1203. At this time, the resolution conversion processing module informs the driver of the coordinate point (RX', RY') of a start point 1205 of the region 1203, and its size (RH' vertical pixels×RW' horizontal pixels), thus obtaining a maximum available region in the original image 1200 from the driver (RX'=0, RY'=0, RH'=9, and RW'=10 in the example in FIG. 12). Also, as understood from the above description, the numbers of pixels to be copied around the original region are saved to form the image 1206. In FIG. 12, CT, CB, CL, and CR respectively indicate the numbers of copied pixels at the upper, lower, left, and right ends. (CT=2, CB=0, CL=3, and CR=1 in the example shown in FIG. 12). Of course, two equations B+RH+B=CT+RH'+CB and B+RW+B=CL+RW'+CR must always hold.

Figure 13A:
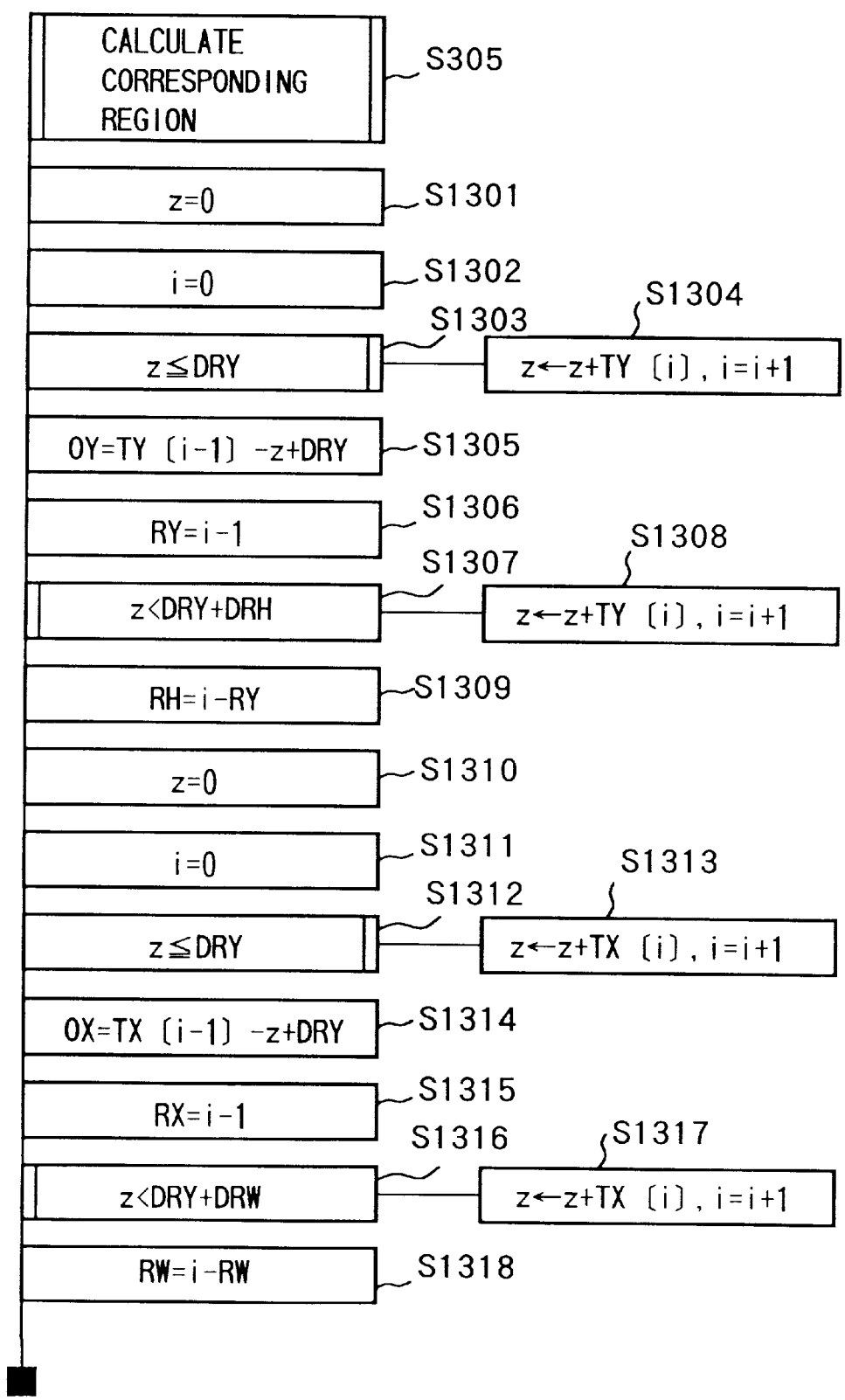
FIG. 13A is a flow chart showing an example of the corresponding region formation sequence.

FIGS. 13A and 13B show the flow of the calculation method of the corresponding region in step S305. In this flow, an original region corresponding to a region having a coordinate point (DRX, DRY) as an upper left point and consisting of DRH vertical pixels×DRW horizontal pixels is calculated using magnification tables TX and TY. At the same time, the position in a region after enlargement of an original pixel (RX, RY) corresponding to the start point (DRX, DRY) is stored in OX and OY. The values stored in OX and OY are important for some enlargement methods, e.g., when the initial values of calculation coefficients are determined upon calculation of the output start point.

In steps S1301 to S1306, the Y-coordinate of the upper left point of the region 1201 is calculated. While adding element values in the vertical magnification table TY[i] (step S1304; after each element value is added to z, i is incremented by 1), the sum is compared with the Y-coordinate value DRY of the start point (step S1303), thereby obtaining the Y-coordinate RY of a source pixel of the start point from the value of index i of the table (step S1306). Also, the value OY can be obtained using the intermediate value (step S1305).

In steps S1307 to S1309, the number of vertical pixels of the region 1201 is calculated. While adding element values in the vertical magnification table TY[i] (step S1308; after each element value is added to z, i is incremented by 1), the sum is compared with the value DRY+DRH (step S1307), thereby obtaining the number RH of vertical pixels of the region 1201 from index i of the table and the value RY obtained previously (step S1309).

In steps S1310 to S1315, the X-coordinate of the upper left point of the region 1201 is calculated. While adding element values in the horizontal magnification table TX[i] (step S1313; after each element value is added to z, i is incremented by 1), the sum is compared with the X-coordinate value DRX of the start point (step S1312), thereby obtaining the X-coordinate RX of the source pixel of the start point from the value of index i of the table (step S1315). Also, the value OX can be obtained using the intermediate value (step S1314).

In steps S1316 to S1318, the number of horizontal pixels of the region 1201 is calculated. While adding element values in the horizontal magnification table TX[i] (step S1317; after each element value is added to z, i is incremented by 1), the sum is compared with the value DRX+DRW (step S1316), thereby obtaining the number RW of horizontal pixels of the region 1201 from index i of the table and the value RX obtained previously (step S1318).

After the start point coordinates (DRX, DRY) and size (DRW, DRH) of the region 1201 are obtained, the start point and size of the regions 1201+1203 requested for the driver are calculated in consideration of the number of required surrounding pixels and the size of the original image.

Steps S1319 and S1320 are preparations for the subsequent operations. That is, CT, CD, CL, and CR are reset to zero, and RX', RY', RW', and RH' are respectively initialized by the corresponding values RX, RY, RW, and RH.

In steps S1321 to S1325, the upper side of the region 1201 is adjusted. That is, the Y-coordinate RY of the start point of the region 1201 obtained in the above steps is compared with a value obtained by decrementing the number B of surrounding pixels by 1 (steps S1321 and S1322). If the value RY has become equal to or larger than the decremented value, since it means that an original pixel that can be used is still present above the region 1201, the region 1201 is extended upward by one pixel (steps S1323 and S1324). By contrast, if the value RY is smaller than the decremented value, since the region 1201 has exceeded the upper end of the original image 1200, 1 is added to CT that stores the number of copied pixels for the upper end portion (step S1325).

In steps S1326 to S1330, the lower side of the region 1201 is adjusted. A value R obtained by adding the previously obtained values RY' and RH' (step S1326) is compared with the value obtained by subtracting the value obtained by decrementing the number B of surrounding pixels by 1 (step S1327) from the number SH of vertical pixels of the original image 1200 (step S1328). If the value R is equal to or smaller than the difference, since it means that an original pixel that can be used is still present below the region 1201, the region 1201 is extended downward by one pixel (step S1329). On the contrary, if the value R is larger than the difference, since the region 1201 has exceeded the lower end of the original image 1200, 1 is added to CB that stores the number of copied pixels of the lower end portion (step S1330).

In steps S1331 to S1335, the left side of the region 1201 is adjusted. The X-coordinate value RX of the start point of the region 1201, obtained previously, is compared with the value obtained by decrementing the number B of surrounding pixels by 1 (steps S1331 and S1332). If the value RX is equal to or larger than the decremented value, since it means that an original pixel that can be used is present on the left side of the region 1201, the region 1201 is extended to the left by one pixel (steps S1333 and S1334). Conversely, if the value RX is smaller than the decremented value, since the region 1201 has exceeded the left end of the original image 1200, 1 is added to CL that stores the number of copied pixels of the left end portion (step S1335)

In steps S1336 to S1340, the right side of the region 1201 is adjusted. A value R obtained by adding the previously obtained values RX' and RW' (step S1336) is compared with a value obtained by subtracting the value obtained by decrementing the number B of surrounding pixels by 1 (step S1337) from the number SW of horizontal pixels of the original image 1200 (step S1338). If the value R is equal to or smaller than the difference, since it means that an original pixel that can be used is still present on the right side of the region 1201, the region 1201 is extended to the right by one pixel (step S1339). By contrast, if the value R is larger than the difference, since the region 1201 has exceeded the right end of the original image 1200, 1 is added to CR that stores the number of copied pixels of the right end portion (step S1340).

When the values obtained in steps S1301 to S1340 are used by the driver and resolution conversion processing module, the image 1206 can be formed on the memory. By processing the image 1206, an output that can suppress distortion of the surrounding portion of the image and is free from any discontinuity between neighboring regions can be obtained.

(Example of Resolution Conversion of Segmented Region)

If a region (start point (RX', RY'), RH' vertical pixels, RW' horizontal pixels) on the original image corresponding to one segmented region is obtained in step S305, this region is resolution-converted in steps S306 to S312.

The resolution conversion is controlled by the value of a status variable (hereinafter referred as Status) obtained in step S308. The variable Status may be END (e.g. binary "100") indicating the end of resolution conversion, PASS_SRC (e.g. binary "001") that requests passing of the next data, and TAKE_DST (e.g. binary "010") that instructs taking of the output from the resolution conversion processing module, or a combination of PASS_SRC and TAKE_DST (e.g. binary "011").

In step S306, Status is initialized to PASS_SRC to instruct the driver to pass the first line of the original region to the resolution conversion processing module. After step S306, steps S308 to S312 are repeated until the value of Status reaches END (step S307).

The reason why the status variable Status is used is to simultaneously cope with special circumstances arising from different image processing operations: outputs for a plurality of lines can be obtained from an input for one line in case of enlargement, the processing method that requires surrounding pixels cannot obtain any output from inputs for several initial lines, an output for one line can only be obtained from inputs for a plurality of lines in case of reduction, and so on. Using the status variable, the driver need only pass an input and take an output to and from the resolution conversion processing module in accordance with the status returned from the module irrespective of the processing methods used. Since an interface is realized by processing in units of lines, the driver can standardize enlargement/reduction of a region having an arbitrary size (regions in units of an arbitrary number of lines) using the image resolution conversion processing module.

In order to realize line by line processing in the resolution conversion of all the regions, a buffer required for resolution conversion must be assured in the resolution conversion processing module. When an original region having a width of RW pixels is to be resolution-converted by a method requiring B surrounding pixels, buffers each having at least a width of RW+B+B pixels are required in correspondence with B+B+1 lines. The resolution conversion processing module sequentially stores input data in these buffers, and starts resolution conversion when the buffers are full of data. The module shifts the buffers (discards the oldest data and stores the next input) as needed and starts processing for the next line. Upon storing the data, the two ends of the buffer are adjusted using the previously obtained values CL and CR.

FIGS. 15A to 15J show the states of the buffers in the resolution conversion processing module.

In FIGS. 15A to 15J, FIG. 15A indicates an empty state, FIG. 15B indicates the state wherein data for the first line is stored in a buffer 1505, and FIGS. 15C to 15E indicate the states wherein data for the second to fourth lines are stored in turn in the buffer 1505 while shifting the buffers. In state FIG. 15F, all the buffers in the resolution conversion processing module are full of input data, and a pixel 1506 is processed using those in a region 1507. The pixels to be processed shift to the right one by one (1508, 1510, 1512), as shown in states FIGS. 15G to 15I, and the regions used shift to the right in units of pixels (1509, 1511, 1513), accordingly. Upon completion of the processing of a buffer 1503, the result is output. Upon completion of the processing using this line, the buffers are shifted to store data for a new line, as shown in state FIG. 15J, and the processing of a pixel 1514 is started using pixels in a region 1515.

Figure 14:
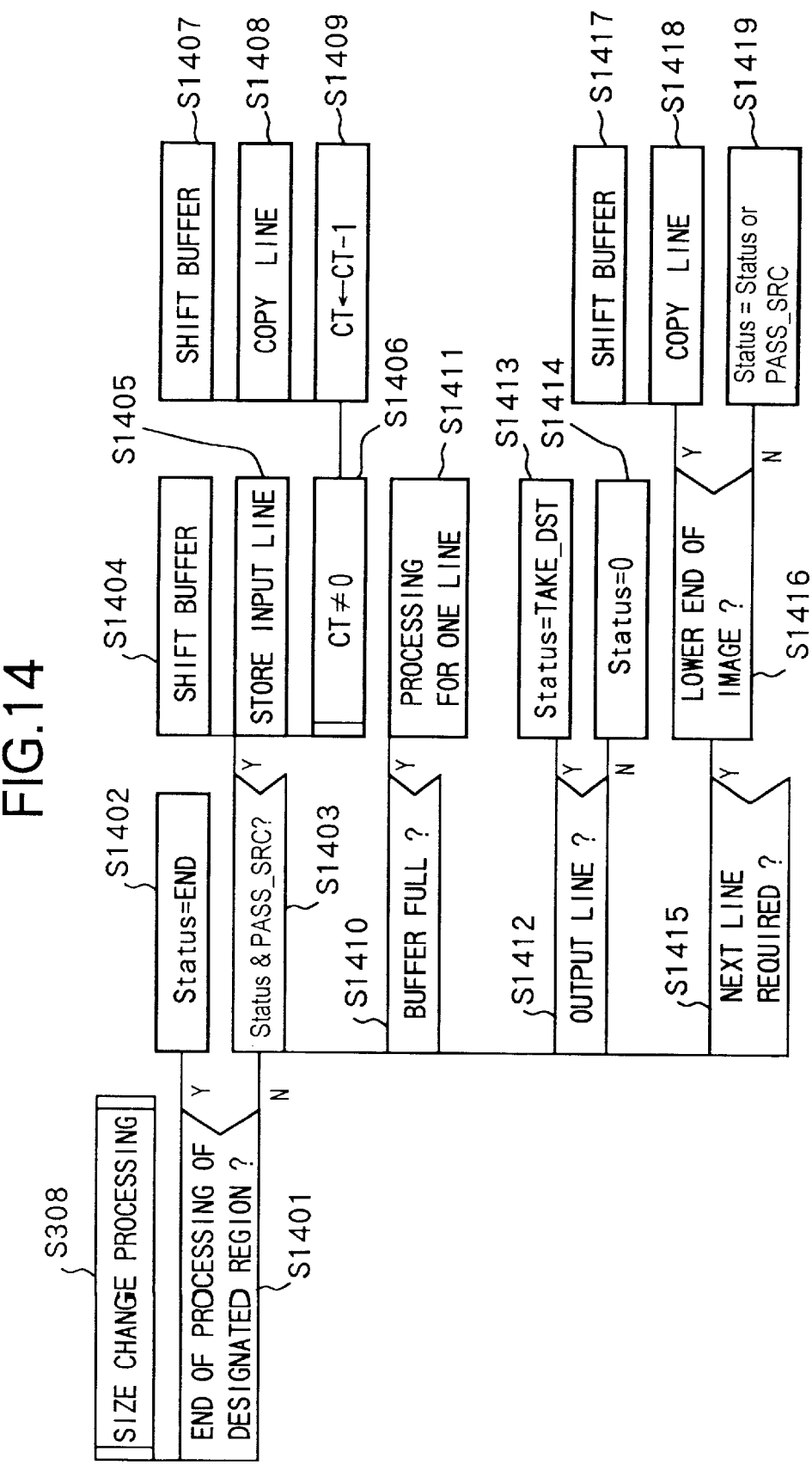
FIG. 14 is a flow chart showing an example of the size change sequence.
Figure 16:
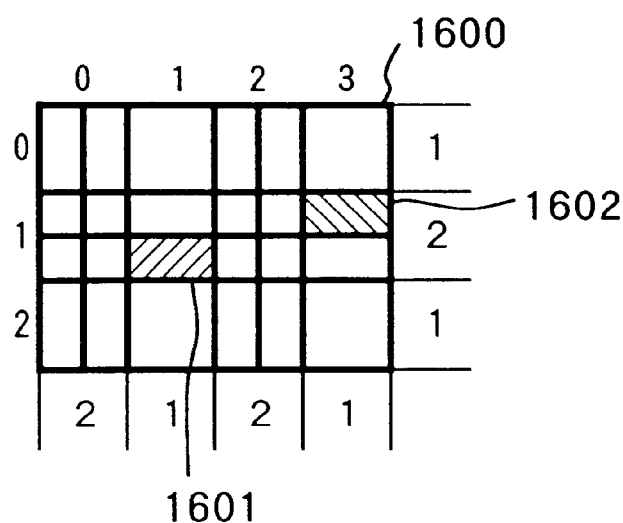
FIG. 16 shows an example of an image after conversion upon reduction.

FIG. 14 shows the flow of the processing in step S308.

In step S1401, it is checked if all the processing steps for the designated region are complete. This checking can be attained by examining the number of already output lines or the like. If the processing steps for the designated region are complete, END is set in the status variable Status, thus ending the processing. As a result, the end of processing in the original region is detected in step S307, and the processing for the next region is started in step S303.

By contrast, if it is determined in step S1401 that all the processing steps in the original region are not complete, the value of the status variable Status is checked (step S1403). "Status & PASS_SRC" means the logical AND operation between Status bits and PASS_SRC bit, and "Y" means that a bit of Status corresponding to PASS_SRC is on. If the status variable at that time includes PASS_SRC, since the next data is passed from the driver, the buffers are shifted in step S1404, and the passed data for the next line is stored in the buffer in step S1405. If pixels in the upper end portion need be copied upon passing data for the first line, line data stored in the buffer is copied in correspondence with the number of lines stored in CT (steps S1406 to S1409).

After storage of the line data is complete, if it is confirmed that all the buffers are full of line data (step S1410), processing for one line is done (step S1411). This processing can use various methods described so far, but it must be noted that no output line may be generated depending on enlargement, reduction, or whether step S1411 is executed. Hence, it is checked in step S1412 if an output line is generated. If an output line is generated, TAKE_DST is set in Status in step S1413; otherwise, "0" (a value indicating none of END, PASS_SRC, TAKE_DST, or any their combination) is set in Status in step S1414.

It is checked in step S1415 if the next processing requires input of the next line data. If the next line data is required, it is checked in step S1416 if the next line data is present. If the current line is the lower end of the original image, and the next data is not acquired, the buffers are shifted in step S1417, and the finally input line data is copied to the buffer in step S1418. On the other hand, if the current line does not reach the lower end of the image yet, PASS_SRC is added to Status set in step S1413 or S1414 (step S1419), and the flow returns to step S1401.

The value set in the status variable Status is checked in steps S309 and S311, and after operation corresponding to the value, the flow returns to step S307.

If the value set in Status in step S308 holds PASS_SRC, input data to be passed in the next calling of the resolution conversion processing module is updated to a line next to the current line (step S319). On the other hand, if the value set in Status in step S308 holds TAKE_DST, the output from the resolution conversion processing module is written in an output buffer prepared in advance (step S312). Note that one or both of steps S310 and S312 may be executed in a single loop depending on the value of Status.

The first embodiment of the present invention has been described mainly along the flow of the image resolution conversion shown in FIG. 4. As described above, according to this embodiment, the conventional problems can be solved, and various kinds of image resolution conversion processing methods can be installed in the printer driver using a standardized interface, and resolution conversion can be installed in the driver.

(Second Embodiment)

The second embodiment will be described below with reference to FIGS. 16 to 19.

The first embodiment has exemplified the case wherein the original image is enlarged in both the vertical and horizontal directions. However, the present invention is not limited to such specific case. Although the formation sequence of the magnification tables slightly varies depending on the combinations of enlargement and reduction, the basic processing sequence is the same as that described above. This embodiment will exemplify the sequence in case of reduction and concentrates on the formation of magnification tables. As an example, the image 500 (4 vertical pixels, 6 horizontal pixels) shown in FIG. 5 is size-converted into an image 1600 (3 vertical pixels, 4 horizontal pixels) shown in FIG. 16. In this example, the image 500 is reduced to 3/4 and 4/6 respectively in the vertical and horizontal directions.

Figure 17:
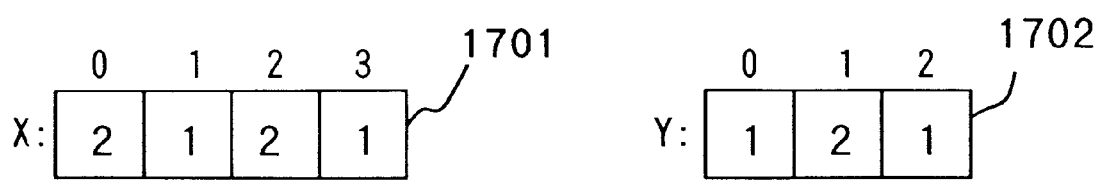
FIG. 17 shows an example of magnification tables upon reduction.

FIG. 17 shows the contents of the magnification tables of this embodiment, and each element of the table indicates the reciprocal number of the corresponding magnification.

As shown in FIG. 17, the values in the respective columns of the image 500 are respectively multiplied by 1/2, 1, 1/2, and 1 according to an X-magnification table 1701, and those in the respective rows are respectively multiplied by 1, 1/2, and 1 according to a Y-magnification table 1702. As can be seen from FIG. 16, a pixel 501 in the image 500 is converted into a portion 1601 of a pixel (1, 1) in the image 1600, and a pixel 502 is converted into a portion of a pixel (3, 1) according to these tables. In general, in case of reduction, a plurality of original pixels generate one converted pixel. In such case, it is a common practice to generate each converted pixel by selecting one pixel from a plurality of original pixels which form that pixel (decimation), or mixing a plurality of original pixels. However, in this embodiment, the reduction method is not particularly limited, and an image can be reduced using the same interface as in enlargement.

Figure 18:
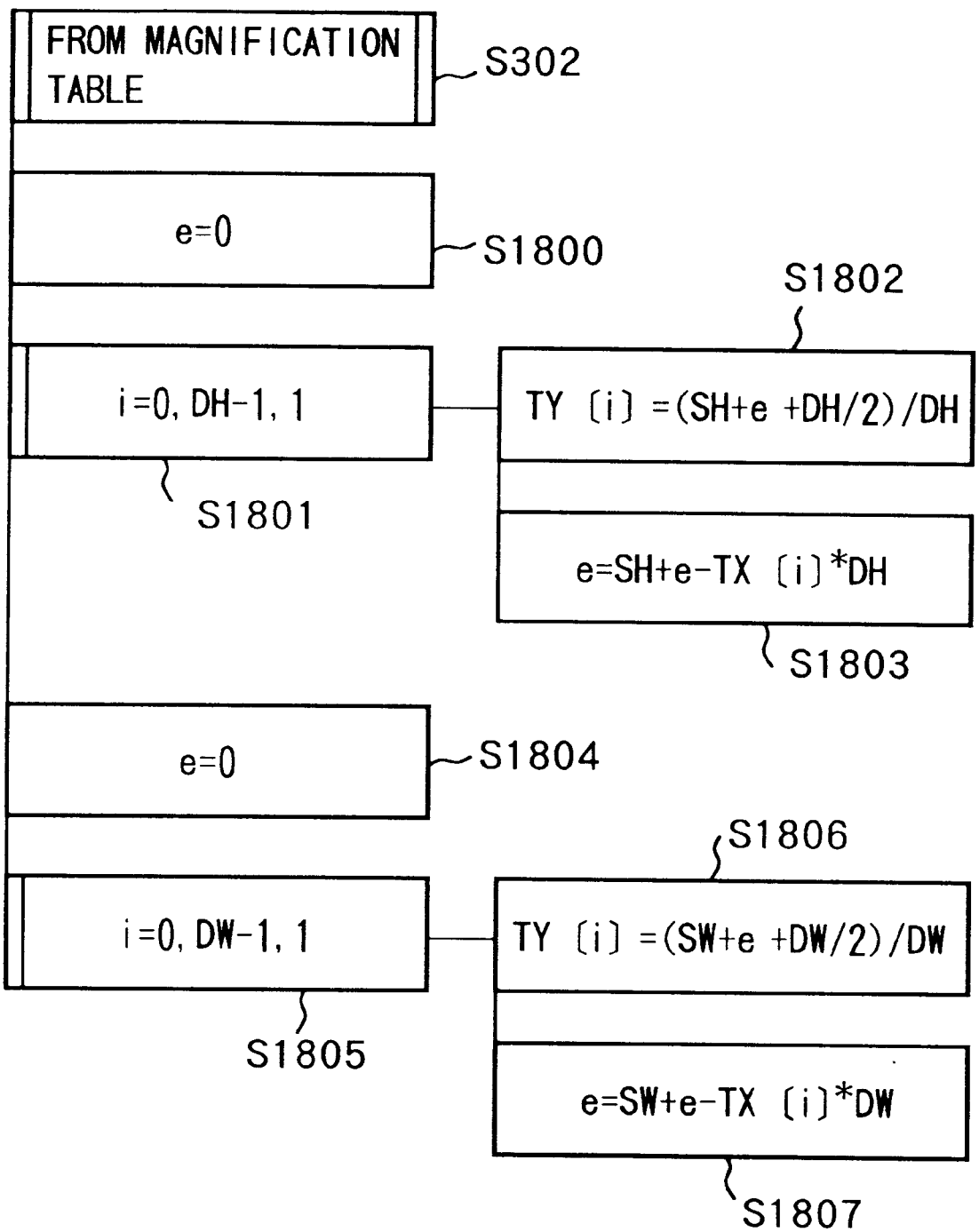
FIG. 18 is a flow chart showing an example of the magnification table formation sequence upon reduction.

FIG. 18 shows the method of forming the magnification tables 1701 and 1702.

In FIG. 18, SH and SW are the numbers of vertical and horizontal pixels (SH=4, SW=6 in the example) of an image before resolution conversion, and DH and DW are the numbers of vertical and horizontal pixels (DH=3, DW=4 in the example) after resolution conversion. TY[i] indicates the i-th element in the Y-magnification table 1702, and TX[i] indicates the i-th element in the X-magnification table 1701. Note that the division is an integer operation, and the quotient is rounded off (e.g., 4/3→1).

The flow of the processing will be explained below. In step S1800, a variable e that stores a calculation error is reset to 0. In step S1801, steps S1802 and S1803 are repeated from 0 to DH−1 while incrementing a variable i in unitary increments. In step S1802, the value of each element in the Y-magnification table is calculated in consideration of the accumulated calculation error. In step S1803, the calculation error is updated. As a result, the Y-magnification table 1702 is formed in steps S1800 to S1803.

Similarly, the variable e that stores a calculation error is reset to 0 again in step S1804. In step S1805, steps S1806 and S1807 are repeated from 0 to DW−1 while incrementing the variable i in unitary increments. In step S1806, the value of each element in the X-magnification table is calculated in consideration of the accumulated calculation error. In step S1807, the calculation error is updated. As a result, the X-magnification table 1701 is formed in steps S1804 to S1807.

The magnification tables 1701 and 1702 are formed by the above-mentioned method. The elements of the magnification tables are integers, as shown in FIG. 17. This embodiment using the magnification tables can attain resolution conversion of an arbitrary magnification by combinations of integer multiples. This means that even a resolution conversion method that can only change image size to a fraction of an integer can change image size to a fraction of a non-integer. Note that the totals of the element values of the magnification tables equal the numbers of vertical and horizontal pixels after processing in case of reduction. For example, the total of elements in the X-magnification table 1701 is 6(=2+1+2+1), which agrees with the number 6 of horizontal pixels of the image 1600 before reduction. Also, the total of elements in the Y-magnification table 1702 is 4 (=1+2+1), which agrees with the number 4 of vertical pixels of the image 1600 before reduction.

Figure 19A:
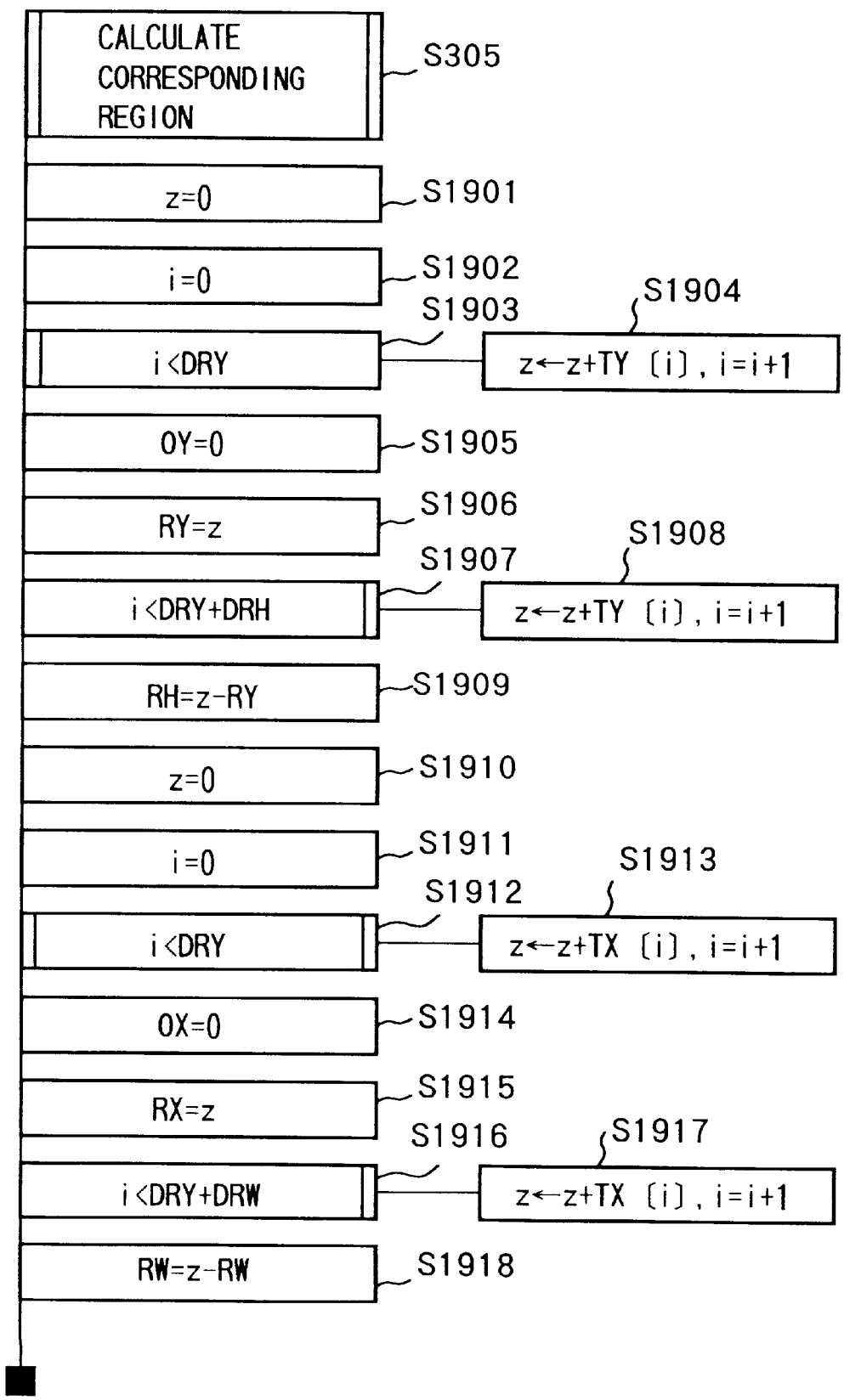
FIG. 19A is a flow chart showing an example of the corresponding region formation sequence.
Figure 19B:
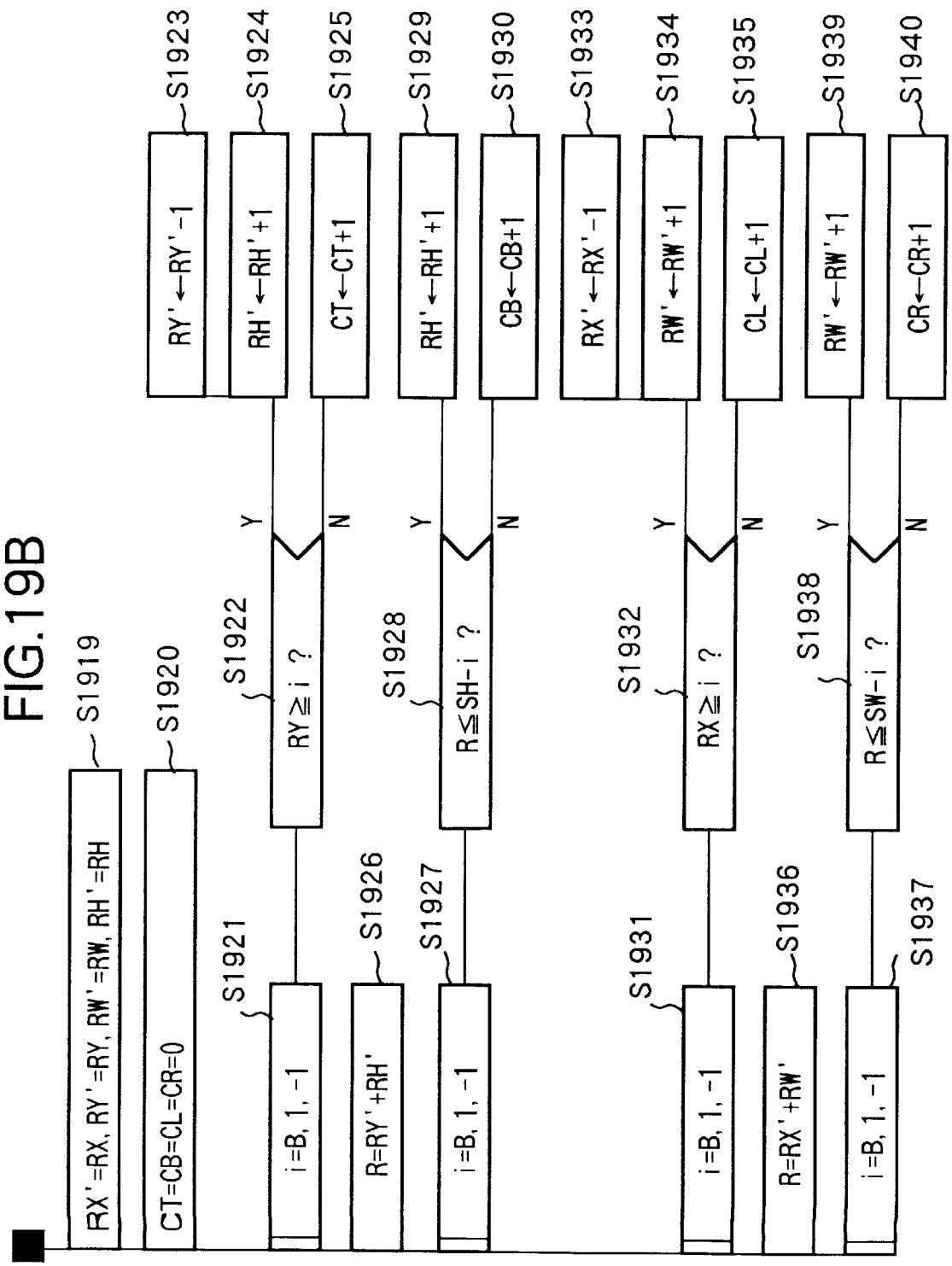
FIG. 19B is a flow chart showing an example of the corresponding region formation sequence.

FIGS. 19A and 19B show the sequence of the method of calculating the corresponding region in case of reduction. In this case, an original region corresponding to a region having a coordinate point (DRX, DRY) as an upper left point and consisting of DRH vertical pixels I DRW horizontal pixels is calculated using magnification tables TX and TY. OX and OY calculated upon enlargement are irrelevant upon reduction, and they are set to 0 in this example.

In steps S1901 to S1906, the Y-coordinate of the upper left point of a region 1201 is calculated. While adding element values in the vertical magnification table TY[i] (step S1904), index i of the magnification table is compared with the Y-coordinate value DRY of the start point (step S1903), thereby obtaining the Y-coordinate RY of a source pixel of the start point from the sum of the element values of the table (step S1906).

In steps S1907 to S1909, the number of vertical pixels of the region 1201 is calculated. While adding element values in the vertical magnification table TY[i] (step S1908), index i of the magnification table is compared with the value DRY+DRH (step S1907), thereby obtaining the number RH of vertical pixels of the region 1201 from the sum of the element values of the table and the value RY obtained previously (step S1909).

In steps S1910 to S1915, the X-coordinate of the upper left point of the region 1201 is calculated. While adding element values in the horizontal magnification table TX[i] (step S1913), index i of the magnification table is compared with the X-coordinate value DRX of the start point (step S1912), thereby obtaining the X-coordinate RX of the source pixel of the start point from the sum of the element values of the table (step S1915).

In steps S1916 to S1918, the number of horizontal pixels of the region 1201 is calculated. While adding element values in the horizontal magnification table TX[i] (step S1917), index i of the magnification table is compared with the value DRX+DRW (step S1916), thereby obtaining the number RW of horizontal pixels of the region 1201 from the sum of the element values of the table and the value RX obtained previously (step S1918).

After the start point coordinates and size of the region 1201 are obtained, the start point and size of the regions 1201+1203 requested for the driver are calculated in consideration of the number of required surrounding pixels and the size of the original image. Since this sequence is the same as that in the first embodiment, a detailed description thereof will be omitted.

After the parameters that can form an image 1206 are obtained by the sequence described so far, every resolution conversion methods can be used. In FIG. 14, the same operation as in enlargement is made in case of reduction. However, in case of reduction, the variable Status always holds PASS_SRC unless the flow reaches step S1417.

As described above, resolution conversion in case of reduction can be done in the same manner as in enlargement by slightly modifying the formation sequence of the magnification tables and the sequence of determining the region before conversion from each converted region.

(Third Embodiment)

Figure 20:
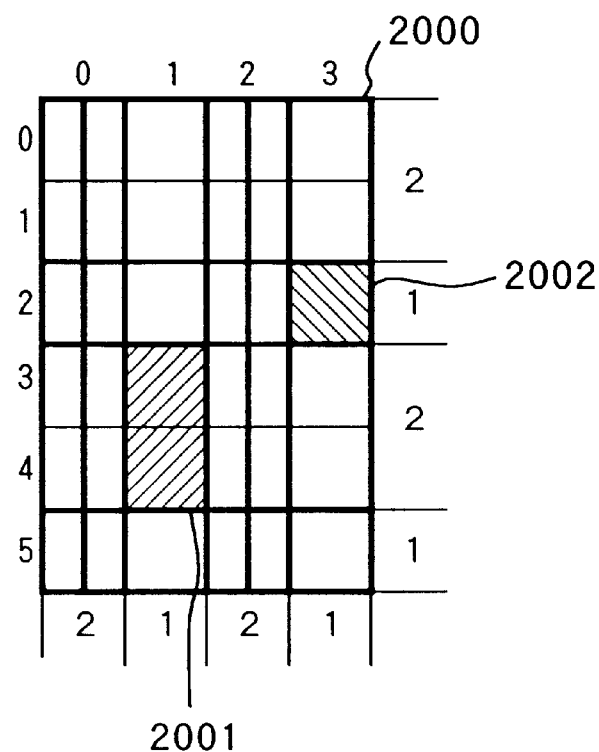
FIG. 20 shows an example of an image after conversion upon combination of enlargement and reduction.

The third embodiment will be described below with reference to FIGS. 20 and 21.

The first embodiment has exemplified the case wherein the original image is enlarged in both the vertical and horizontal directions, and the second embodiment has exemplified the case wherein the original image is reduced in both the vertical and horizontal directions. However, the present invention is not limited to such specific cases. This embodiment will exemplify a case wherein the image 500 (4 vertical pixels, 6 horizontal pixels) shown in FIG. 5 is size-converted into an image 2000 (6 vertical pixels, 4 horizontal pixels) shown in FIG.20. In this example, the image 500 is enlarged to 6/4 in the vertical direction, and is reduced to 4/6 in the horizontal direction.

Figure 21:
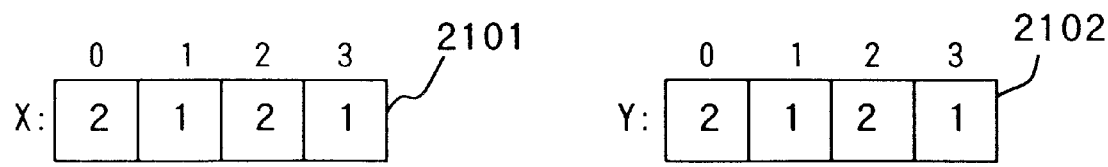
FIG. 21 shows an example of magnification tables upon combination of enlargement and reduction.

FIG. 21 shows the contents of magnification tables in this example. In FIG. 21, the reciprocal numbers of the magnifications are shown in the X-direction, and the magnifications are shown in the Y-direction.

As shown in FIG. 21, the values in the respective columns of the image 500 are respectively multiplied by 1/2, 1, 1/2, and 1 according to an X-magnification table 2101, and those in the respective rows are respectively multiplied by 2, 1, 2, and 1 according to a Y-magnification table 2102. As can be seen from FIG. 20, a pixel 501 in the image 500 is converted into a region 2001 in the image 2000, and a pixel 502 is converted into a pixel 2002.

When both enlargement and reduction are used, all the parameters required for forming an image 1206 can be easily obtained by combining the formation sequences of the magnification tables and the sequence of determining the region before conversion from each converted region described in the first and second embodiments. As can be easily seen from the above description, the enlargement and reduction methods are then applied in turn to obtain a target image.

As described above, even when both enlargement and reduction are used, resolution conversion can be done in the same manner as in the above embodiments by slightly modifying the formation sequence of the magnification tables and the sequence of determining the region before conversion from each converted region.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the above-mentioned flow charts. This will be briefly described below. That is, the storage medium stores modules shown in each memory map example shown in FIG. 22. More specifically, the storage medium need only store program codes of a magnification table formation module, a corresponding region calculation module, a size change processing module, and an interface module (with other programs). Furthermore, a printer driver that installs these modules as a resolution conversion module or an image processing program group consisting of drivers including that printer driver may be stored in the storage medium.

When the storage medium is an external storage medium such as a floppy disk, CD-ROM, or the like, and the modules are installed in the printer driver or the like in a computer or the printer driver is to be updated, the storage medium preferably stores an installation program.

As many apparently widely different embodiments of the present invention can be made without departing from the spirit and scope thereof, it is to be understood that the invention is not limited to the specific embodiments thereof except as defined in the appended claims.

What is claimed is:

1. A resolution conversion module for converting a resolution of image data, comprising the steps of:
   receiving information representing resolutions before and after conversion from a printer driver;
   calculating a magnification or reduction value for each pixel of an original image before conversion on the basis of the received information;
   receiving information of a processing region, which is segmented with reference to an image size after conversion, from the printer driver;
   obtaining a region on the original image before conversion corresponding to the segmented processing region on the basis of the magnification or reduction values for pixels;
   passing information of the obtained region on the original image before conversion to the printer driver;
   receiving original image data of the obtained region from the printer driver;
   changing a size of the received original image data on the basis of the magnification or reduction values for pixels; and
   passing the data of the region after resolution conversion to the printer driver.

2. The module according to claim 1, wherein the information representing the resolutions before and after conversion represents sizes of image data before and after conversion, which are expressed by the numbers of pixels.

3. The module according to claim 1, wherein the magnification or reduction values for the pixels of the original image before conversion include a combination of an integer multiple or a fraction of an integer so that a sum of magnification or reduction values for a plurality of pixel yield magnification of the resolutions before and after conversion.

4. The module according to claim 1, wherein the information of the segmented processing region includes a start point position and size of the region.

5. The module according to claim 4, wherein the step of obtaining the region on the original image includes the steps of:

adjusting the start point and size using the number of pixels required for resolution conversion; and adjusting the start point and size of the region in consideration of end portions of the original image.

6. The module according to claim 1, wherein the information of the obtained region on the original image includes a start point position and size of the region.

7. The module according to claim 1, wherein the step of changing the size of the image includes the steps of:

receiving image data in units of lines;

holding the received image data in correspondence with the number of lines required for changing the size;

discarding image data for the line which has become unnecessary and updating the image data to image data for a new line; and outputting processed data in units of lines.

8. A resolution conversion module which is installed in printer driver when it is used, and converts a resolution of image data, comprising the steps of:

receiving information representing resolutions before and after conversion from the printer driver;

calculating a magnification or reduction value for each pixel of an original image before conversion on the basis of the received information;

receiving information of a processing region, which is segmented with reference to an image size after conversion, from the printer driver;

obtaining a region on the original image before conversion corresponding to the segmented processing region on the basis of the magnification or reduction values for pixels;

passing information of the obtained region on the original image to the printer driver, requesting the printer driver to transfer original image data, and receiving the original image data of the obtained region therefrom;

changing a size of an image on the basis of the magnification or reduction values for pixels for each obtained region on the original image; and requesting the printer driver to take size-changed data, and passing the data of the region after resolution conversion, wherein the resolution after conversion is the resolution of a printer, and the processing region which is segmented with reference to the image size after conversion is a band region.

9. The module according to claim 8, wherein the information representing the resolutions before and after conversion represents sizes of image data before and after conversion, which are expressed by the numbers of pixels.

10. The module according to claim 8, wherein the magnification or reduction values for the pixels of the original image before conversion include a combination f an integer multiple or a fraction of an integer so that a sum of magnification or reduction values for a plurality of pixel yield magnification of the resolutions before and after conversion.

11. The module according to claim 8, wherein the information of the segmented processing region includes a start point position and size of the region.

12. The module according to claim 11, wherein the step of obtaining the region on the original image includes the steps of:

adjusting the start point and size using the number of pixels required for resolution conversion; and adjusting the start point and size of the region in consideration of end portions of the original image.

13. The module according to claim 8, wherein the information of the obtained region on the original image includes a start point position and size of the region.

14. The module according to claim 8, wherein the step of changing the size of the image includes the steps of:

receiving image data in units of lines;

holding the received image data in correspondence with the number of lines required for changing the size;

discarding image data for the line which has become unnecessary and updating the image data to image data for a new line; and outputting processed data in units of lines.

15. A printer driver installed with a resolution conversion module for image data, said resolution conversion module comprising the steps of:

receiving information representing resolutions before and after conversion from said driver;

calculating a magnification or reduction value for each pixel of an original image before conversion on the basis of the received information;

receiving information of a processing region, which is segmented with reference to an image size after conversion, from said driver;

obtaining a region on the original image before conversion corresponding to the segmented processing region on the basis of the magnification or reduction values for pixels;

passing information of the obtained region on the original image to said driver, requesting said driver to transfer original image data, and receiving the original image data of the obtained region therefrom;

changing a size of an image on the basis of the magnification or reduction values for pixels for each obtained region on the original image; and requesting said driver to take size-changed data, and passing the data of the region after resolution conversion.

16. The driver according to claim 15, wherein the information representing the resolutions before and after conversion represents sizes of image data before and after conversion, which are expressed by the numbers of pixels.

17. An image resolution conversion method for converting a resolution of image data, wherein when there are a resolution conversion module for performing resolution conversion and a printer driver that requires resolution conversion of image data, information representing resolutions before and after conversion and information of a processing region segmented with reference to an image size after conversion are passed from said printer driver to said resolution conversion module, said resolution conversion module calculates a magnification or reduction value for each pixel of an original image before conversion on the basis of the information representing the resolutions before and after conversion, obtains a region on the original image before conversion corresponding to the segmented processing region on the basis of the magnification or reduction values for pixels, passes the information of the obtained region to said printer driver, and requests said printer driver to transfer original image data of the region on the original image, and when the original image data of the region is passed from said printer driver to said resolution conversion program, said resolution conversion program changes a size of an image on the basis of the magnifications or reduction values for pixels for each obtained region on the original image, and sends back size-changed image data to said printer driver.

18. The method according to claim 17, wherein the information representing the resolutions before and after conversion represents sizes of image data before and after conversion, which are expressed by the numbers of pixels.

19. The method according to claim 17, wherein when the region on the original image is obtained, a start point and size are adjusted using the number of pixels required for resolution conversion, and a start point and size of the region are adjusted in consideration of end portions of the original image.

20. A computer readable memory that stores a program for converting a resolution of image data, having a resolution conversion module for converting the resolution, and a printer driver with said resolution conversion module, said resolution conversion module comprising:

a magnification generation module for calculating a magnification or reduction value for each pixel of an original image before conversion on the basis of information representing resolutions before and after conversion;

a corresponding region calculation module for calculating a region on the original image before conversion corresponding to a processing region, which is segmented with reference to an image size after conversion, on the basis of the magnification or reduction values for pixels;

a size change processing module for changing a size of original image data of the calculated region on the basis of the magnification or reduction values for pixels; and an interface module for receiving the information representing the resolutions before and after conversion, the information of the segmented processing region, and the original image data of the calculated region from said printer driver, and passing the information of the calculated region and data after resolution conversion of the segmented region to said printer driver.

* * * * *

UNITED STATES PATENT AND TRADEMARK OFFICE
CERTIFICATE OF CORRECTION

PATENT NO. : 6,333,792 B1
DATED : December 25, 2001
INVENTOR(S) : Takeo Kimura

Figure 22:
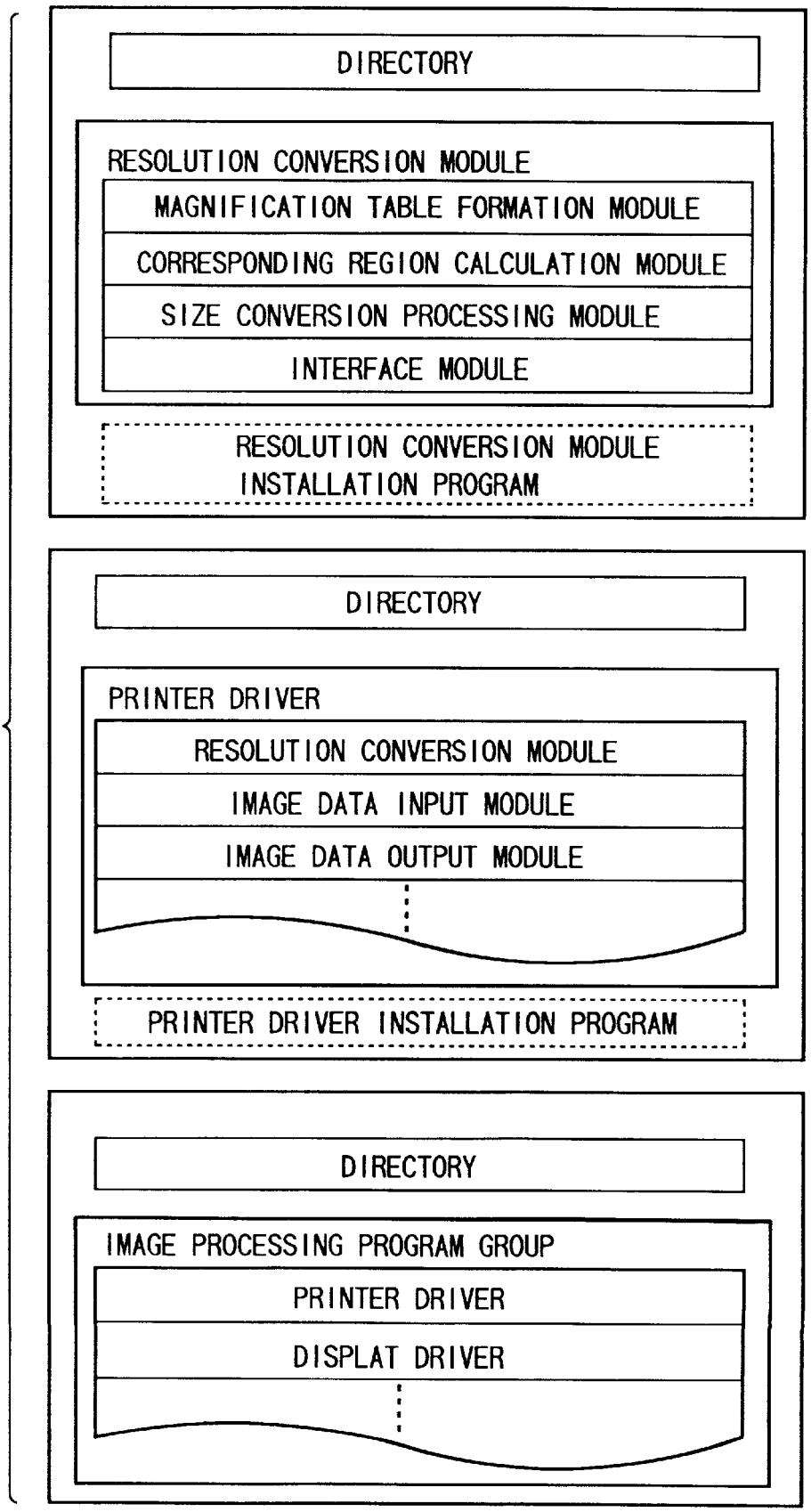
FIG. 22 shows various memory map examples on a storage medium.

It is certified that error appears in the above-identified patent and that said Letters Patent is hereby corrected as shown below:

<u>Drawings,</u>
Sheet 21, FIG. 22, "DISPLAT" should read -- DISPLAY --.

<u>Column 9,</u>
Line 27, "degree" should read -- degrees --.

<u>Column 14,</u>
Line 23, "their" should read -- other --; and
Line 30, "finally" should read -- final --.

<u>Column 18,</u>
Line 42, "driver;" should read -- driver, the information of the obtained region including a start point position and size of the obtained region; --; and
Line 43, "receiving" should read -- receiving, in response to the passed information to the printer driver, --.

<u>Column 19,</u>
Line 16, "in" should read -- in a --;
Line 33, "driver," should read -- driver, the information of the obtained region including a start point position and size of the obtained region, --;
Line 34, "receiving" should read -- receiving, in response to the request, --; and
Line 52, "f an" should read -- of an --.

<u>Column 20,</u>
Line 31, "driver," should read -- driver, the information of the obtained region including a start point position and size of the obtained region, --;
Line 32, "receiving" should read -- receiving, in response to the request, --;
Line 62, "driver," should read -- driver, the information of the obtained region including a start point position and size of the obtained region, --;
Line 66, "program," should read -- program in response to the request, --.

UNITED STATES PATENT AND TRADEMARK OFFICE
CERTIFICATE OF CORRECTION

PATENT NO. : 6,333,792 B1
DATED : December 25, 2001
INVENTOR(S) : Takeo Kimura

It is certified that error appears in the above-identified patent and that said Letters Patent is hereby corrected as shown below:

<u>Column 22,</u>
Line 19, "region" should read -- region, the information of the calculated region including a start point position and size of the calculated region, --.

Signed and Sealed this

Fifth Day of November, 2002

Attest:

JAMES E. ROGAN
Attesting Officer    Director of the United States Patent and Trademark Office